(12) United States Patent
Hamada et al.

(10) Patent No.: US 6,901,308 B1
(45) Date of Patent: May 31, 2005

(54) SYSTEM LEVEL ANALYSIS AND CONTROL OF MANUFACTURING PROCESS VARIATION

(75) Inventors: Michael S. Hamada, Los Alamos, NM (US); Harry F. Martz, Los Alamos, NM (US); Jay K. Eleswarpu, West Chester, OH (US); Michael J. Preissler, Maineville, OH (US)

(73) Assignee: The Regents of the University of California, Los Alamos, NM (US)

( * ) Notice: Subject to any disclaimer, the term of this patent is extended or adjusted under 35 U.S.C. 154(b) by 301 days.

(21) Appl. No.: 10/191,202

(22) Filed: Jul. 9, 2002

(51) Int. Cl.[7] .............................................. G06F 19/00
(52) U.S. Cl. .......................... 700/173; 700/29; 700/31
(58) Field of Search ............................... 700/108, 109, 700/97, 28–34, 169, 173; 703/2, 6

(56) References Cited

U.S. PATENT DOCUMENTS

| | | | | |
|---|---|---|---|---|
| 5,787,269 | A | * | 7/1998 | Hyodo ......................... 703/13 |
| 6,556,960 | B1 | * | 4/2003 | Bishop et al. .................. 703/2 |
| 6,671,661 | B1 | * | 12/2003 | Bishop ........................... 703/2 |
| 6,708,073 | B1 | * | 3/2004 | Heavlin ....................... 700/121 |
| 2003/0176938 | A1 | * | 9/2003 | Tuszynski .................... 700/97 |

OTHER PUBLICATIONS

DiCiccio et al., "Computing Bayes Factors By Combining Simulation And Asymptotic Aproximations", ) May 23, 1996,.*

Kass et al., "Markov Chain Monte Carlo in Practice: A Roundtable Discussion", Feb. 1997.*

* cited by examiner

*Primary Examiner*—Leo Picard
*Assistant Examiner*—Chad Rapp
(74) *Attorney, Agent, or Firm*—Ray G. Wilson

(57) ABSTRACT

A computer-implemented method is implemented for determining the variability of a manufacturing system having a plurality of subsystems. Each subsystem of the plurality of subsystems is characterized by signal factors, noise factors, control factors, and an output response, all having mean and variance values. Response models are then fitted to each subsystem to determine unknown coefficients for use in the response models that characterize the relationship between the signal factors, noise factors, control factors, and the corresponding output response having mean and variance values that are related to the signal factors, noise factors, and control factors. The response models for each subsystem are coupled to model the output of the manufacturing system as a whole. The coefficients of the fitted response models are randomly varied to propagate variances through the plurality of subsystems and values of signal factors and control factors are found to optimize the output of the manufacturing system to meet a specified criterion.

7 Claims, 2 Drawing Sheets

SYSTEM LEVEL ANALYSIS AND CONTROL OF MANUFACTURING PROCESS VARIATION

STATEMENT REGARDING FEDERAL RIGHTS

This invention was made with government support under Contract No. W-7405-ENG-36 awarded by the U.S. Department of Energy and CRADA No. LA99C10420-A002. The government has certain rights in the invention.

FIELD OF THE INVENTION

The present invention relates generally to optimizing the performance of manufacturing systems, and, more particularly, to analysis and control of process variations in a manufacturing process to improve product and process reliability.

BACKGROUND OF THE INVENTION

Variability (or variation) in key process performance measures (such as measures of quality) is an extremely important aspect of most manufacturing processes. It is widely recognized that control of undesired variation can be instrumental in improving both process and product reliability. For example, consider the set of processing transformations illustrated in FIG. 2. The set of transformations depicted in FIG. 2 is referred to herein as a process or system. Each individual transformation is referred to as a subprocessing operation, or subprocess.

The inputs to each subprocess are the so-called signal and noise factors, while the output is termed the response variable. Although there may be more than one response variable of interest, consider the case of a single response from each subprocess. Changes in signal factors generally result in a relatively large change (or shift) in the response distribution, while noise factors represent (and thus contribute to) unavoidable and undesirable nuisance variation in the response variable.

There also is usually one or more control factors (or variables) associated with each subprocess shown as inputs to each "block". Values (or settings) of these control factors can often be identified so that they minimize the unwanted and undesirable variation in the response.

Further, there are connections between subprocesses through which variation is transmitted or propagated throughout the system. In other words, this "coupling" of subprocesses represents the collection of pathways by means of which variation is transmitted downstream or upstream to connected systems. Note that the response from an upstream transformation may subsequently become either the signal or noise factor for one or more connected transformations.

For convenience and simplicity, only a single response from each subprocess is depicted in FIG. 2. The case of multiple responses represents a straightforward extension of the method to be described.

Several papers consider the propagation of process variation throughout a process having multiple processing stages. Fong and Lawless (1998) discuss a method for estimating the variation in product quality characteristics measured at multiple stages in a manufacturing process in which there are multiple measurements. The process considered is a linear assembly process required in the installation of car hoods. Lawless, MacKay and Robinson (1999) and Agrawal, Lawless and MacKay (1999) also discuss methods for analyzing variation in a multistage linear manufacturing process.

Gerth and Hancock (1995) describe the use of stepwise regression for determining which control factors should receive the most attention. They also consider where engineering efforts should be focused to better center the process mean or to reduce process variation.

Suri and Otto (1999A and 1999B) present an integrated system model based on the use of feed-forward control theory to reduce unwanted end-of-line variation in a manufacturing process. They argue that optimizing each subprocess individually (using such methods as Taguchi robust design methods or response surface methods) does not guarantee the lowest end-of-line variation. They consider system-level parameter design (i.e., the choice of control factor levels) in which the entire process is simultaneously optimized as a complete set. Each of the existing methods that addresses the problem of variation propagation through a series of manufacturing stages or subprocesses has one or more significant restrictions or shortcomings. In addition, none of these methods is nearly as robust nor as applicable to as many different situations likely to be encountered in practice as the method presented here.

The method of Lawless and Mackay (1999) is restricted to linear assembly processes, while that of Gerth and Hancock (1995) considers only the use of stepwise regression an a means for determining important process control variables. Suri and Otto (1999A and 1999B) explicitly require that the process behavior be linear in the region of local operating conditions.

The method according to the present invention has none of these restrictions and can be applied to both linear and non-linear processes. In addition, multiple response variables can be simultaneously considered. This method permits both means and variances to be modeled using either linear or nonlinear response models. The approach described herein completely accounts for the state-of-knowledge uncertainty and correlation between parameter estimates in all the fitted response models. Thus, the desired system output reflects all relevant sources of uncertainty.

Finally, there are no restrictions on how the subprocesses can be coupled. In summary, the present invention permits the simultaneous consideration of signal, noise, and control variables for both subprocess means and variances of coupled linear or non-linear subprocesses. Together, these represent a significant advancement over existing methods.

Although the present invention is directed to the same overall objective, a straightforward and simple-to-use statistical method based on the use of response models is presented.

Various features of the present invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

REFERENCES

Agrawal, R., Lawless, J. F., and MacKay, R. J. (1999), "Analysis of Variation Transmission in Manufacturing Processes—Part II," Journal of Quality Technology, 31, 143–154.

Berger, J. O. (1985), Statistical Decision Theory and Bayesian Analysis (2nd Ed.), New York: Springer-Verlag.

Carlin, B. P. and Louis, T. A. (1996), Bayes and Empirical Bayes Methods for Data Analysis, London: Chapman & Hall.

Fong, D. Y. T. and Lawless, J. F. (1998), "The Analysis of Process Variation Transmission with Multivariate Measurements," Statistica Sinica, 8, 151–164.

Gelman, A., Carlin, J. B., Stem, H. S. and Rubin, D. B. (1995), Bayesian Data Analysis, London: Chapman & Hall.

Gerth, R. J. and Hancock, W. M. (1995), "Output Variation Reduction of Production Systems Involving a Large Number of Subprocesses," Quality Engineering, 8, 145–163.

Gilks, W. R., Richardson, S. and Spiegelhalter, D. J. (1996), Markov Chain Monte Carlo in Practice, London: Chapman & Hall.

Gilks, W. R., Thomas, A. and Spiegelhalter, D. J. (1994), "A Language and Program for Complex Bayesian Modeling," The Statistician, 43, 169–178.

Goldberg, D. E. (1989), Genetic Algorithms in Search, Optimization and Machine Learning, New York: Addison-Wesley.

Lawless, J. F., MacKay, R. J., and Robinson, J. A. (1999), "Analysis of Variation Transmission in Manufacturing Processes—Part I," Journal of Quality Technology, 31, 131–142.

Michalewicz, Z. (1992), Genetic Algorithms+Data Structures=Evolution Programs, New York: Springer-Verlag.

Reese, C. S., Wilson, A. G., Hamada, M. S., Martz, H. F. and Ryan, K. J. (2000), "Integrated Analysis of Computer and Physical Experiments," Los Alamos National Laboratory Report LA-UR-00-2915.

Suri, R. and Otto, K. (1999A), "Evaluating Variation Reduction Process Control Strategies Through System Modeling," in Proceedings of ASME-1999 IMECE, Advances in Sheet Metal Forming, Nov. 14–19, 1999, Nashville, Tenn.

Suri, R. and Otto, K. (1999B), "System-Level Robustness Through Integrated Modeling," in Proceedings of the 11th International Conference on Design Theory and Methodology: 1999 ASME Design Engineering Technical Conferences, Sep. 12–15, 1999, Las Vegas, Nev.

SUMMARY OF THE INVENTION

The present invention includes a computer-implemented method for determining the variability of a manufacturing system having a plurality of subsystems. Each subsystem of the plurality of subsystems is characterized by signal factors, noise factors, control factors, and an output response, all having mean and variance values. Response models are then fitted to each subsystem to determine unknown coefficients for use in the response models that characterize the relationship between the signal factors, noise factors, control factors, and the corresponding output response having mean and variance values that are related to the signal factors, noise factors, and control factors. The response models for each subsystem are coupled to model the output of the manufacturing system as a whole. The coefficients of the fitted response models are randomly varied to propagate variances through the plurality of subsystems and values of signal factors and control factors are found to optimize the output of the manufacturing system to meet a specified criterion.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
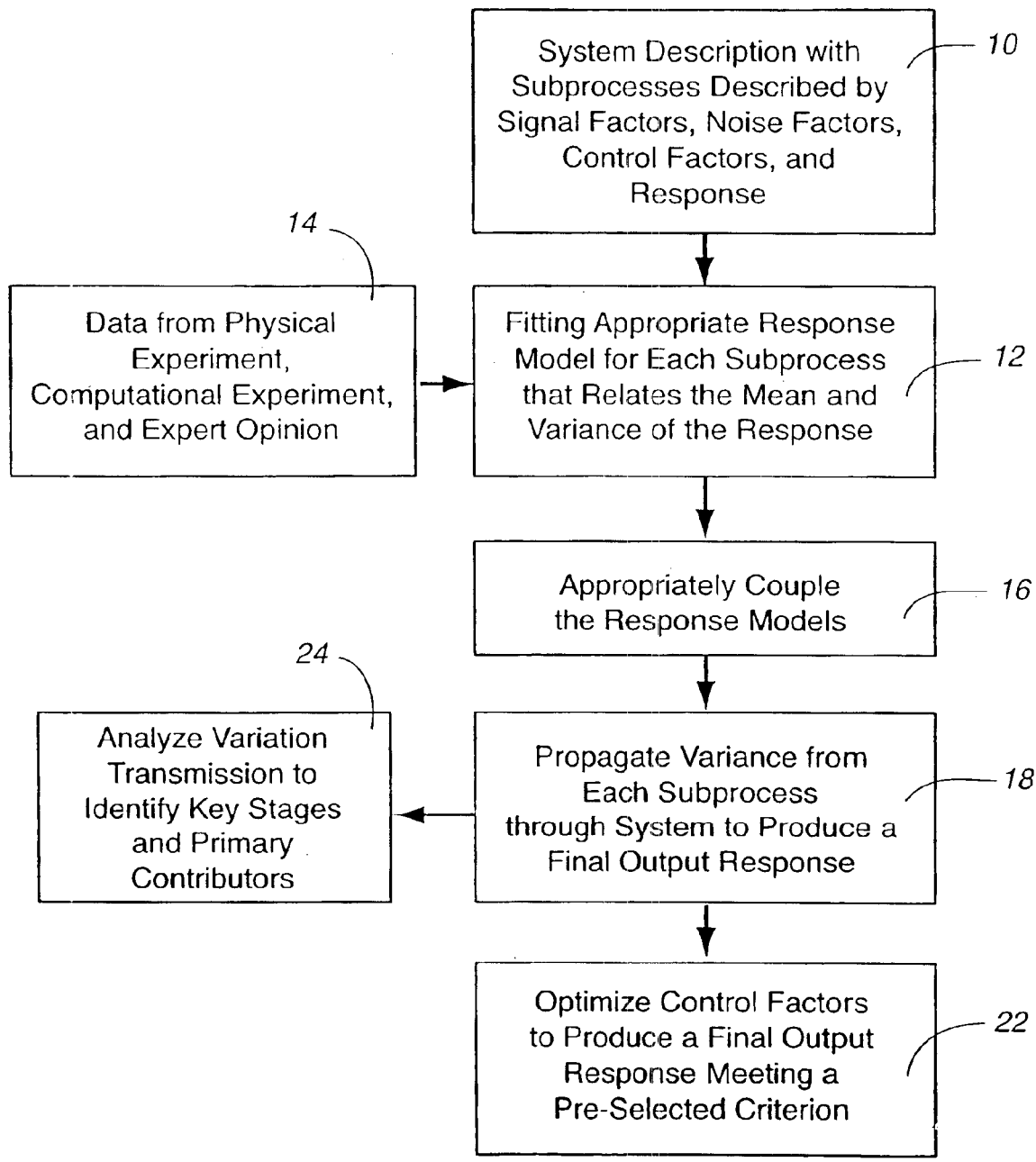
FIG. 1 is a block diagram that illustrates one embodiment of the method of the present invention.

Referring to FIG. 1, the present invention includes a three-step (fitting, propagating and optimizing) system-level method that can be used to study the variation that is added at different subsystem stages in a system with subsystems described 10 by signal factors, noise factors, control factors, and output response This method also permits an analysis of the extent to which this variation is transmitted upstream and downstream to connected stages and ultimately throughout the system. In particular, there may be certain subsystems where considerable variation originates, and other subsystems that essentially filter out variation introduced through connected subsystems. Because of the dynamic non-linear way that variation is usually propagated through most systems, optimizing each subsystem individually does not guarantee the lowest overall process variation. In contrast to subsystem-level robust design optimization, system-level robust design optimization ensures that control applied at each subsystem considers the effect on the overall system.

As used herein, the term "system" and "subsystem" mean a product or process and subproduct or subprocess, respectively, and combinations thereof. While the exemplary method described herein is based on a manufacturing process, it will be apparent that the method can be applied readily to products. The scope of the claims herein should be broadly construed in accordance with this definition.

The first step consists of fitting 12 appropriate response models for each subprocess that can be used to express the robustness (e.g., using the mean and variance). The process of estimating the unknown coefficients in an assumed response model is commonly known as "fitting" the model to data 14. Response model data 14 may be obtained from traditional physical experiments, computational (computer-based) experiments, or expert opinions. These models capture the relationship between the signal, control and noise factors and the corresponding response. The uncertainty inherent in fitting these models is also captured in this first step.

The second step consists of propagating a variation introduced at each subprocess through the system. The models fitted 12 at the first step are first appropriately coupled 16 to form a desired manufacturing process from the subprocess. Once the models have been coupled, variation is then propagated 18 through the entire system.

By understanding how such variation is added and transmitted through the entire system, variation reduction efforts can be optimized. One variation reduction effort is the particular choice of control factor settings that (nearly) optimizes some specified criterion. For example, control factor settings are chosen such that the mean-squared error about some pre-specified target level is nearly minimized. Determination of such (near) optimal system-level robust process designs constitutes the third step of the procedure.

The three-step procedure can be used to find 22 optimal control factor settings that produce a final process output response that is robust to noise factors. In addition, the method can be used to analyze 24 variation transmission through a complex nonlinear process in order to identify key stages and primary contributors.

A simple three-subprocess exemplary process is discussed below to teach the system-level modeling approach to robustness. Response models describe the relationship between the input factors and the response for each subprocess. Finally, the use of simple, available Bayesian computational tools for implementing this approach is described. The same statistical software is used to propagate the variation through the system. Then, a method based on the use of genetic algorithms (GAs) is described for use in identifying the control factor settings that nearly-optimize virtually any user-selected criterion.

Step 1—Fitting Response Models for Use in Analyzing Process Robustness

Figure 2:
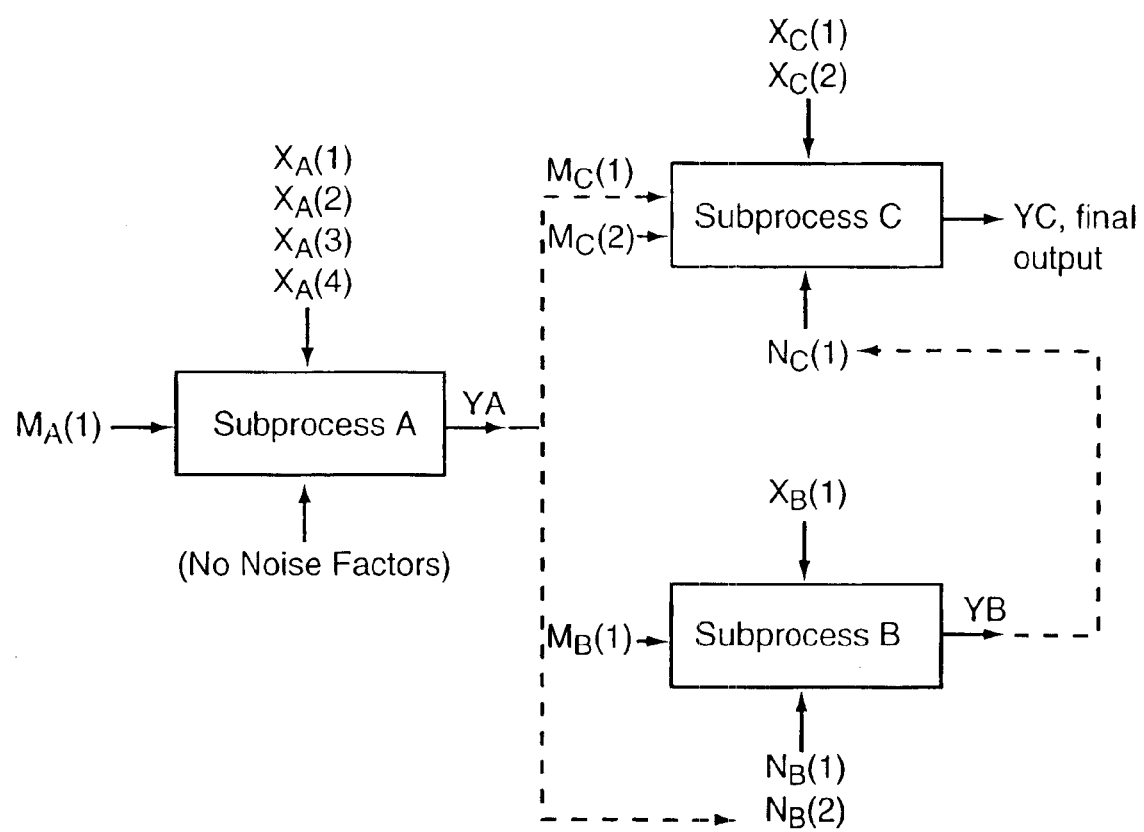
FIG. 2 is an exemplary schematic of connected subsystems that form a manufacturing system to be optimized according to the process depicted in FIG. 1.

Consider the system consisting of three subprocesses A, B and C shown in FIG. 2. Signal factors are denoted by the letter "M," noise factors by "N," control factors by "X," and the response by "y." The subscript A, B or C denotes the particular subprocess of interest, while a numerical argument in parentheses identifies multiple factors of the same type.

This simple model captures all the different ways that responses in FIG. 2 serve as an input noise or signal in subsequent connected subprocesses. Note that the signal input in downstream subprocess B, $M_B(1)$, is a stand-alone input, while the same is true for $M_c(2)$. Of primary interest is the distribution of the final output from subprocess C, $y_c$. A particular interest is the distribution of $y_c$ for use in determining which signal and control factor levels ensure a robust overall process design.

Recall that the first step in the present invention is to develop an appropriate response model for each subprocess that relates the mean and variance of a response y to the signal, control and noise factors. These models can be fitted using data obtained from three possible sources of information: a traditional physical experiment; a computational (computer-based) experiment, i.e., a computer simulation; or expert opinion. If replicated measurements are made in a well-designed physical experiment, corresponding response models for both the mean and variance of the response y can be postulated and fitted. In contrast, because replicated measurements in a deterministic computational experiment are identical, such data can only be used to fit a response model for the mean, and not the variance, of the response. In this case, the variance must be assumed to be constant for the corresponding subprocess. If expert opinion is elicited regarding both the mean and variance of the response, then corresponding response models can be developed and used much as they are for physical experimental data with replications. The integrated use of these three types of data can also be considered (see Reese et al., 2000).

For illustrative purposes herein, appropriate response models will be fitted using data obtained from a physically designed experiment at each subprocess. All the details in fitting the required two response models for subprocess A will be considered; however, because, while the approach is identical, significantly less detail is presented for subprocesses B and C.

A hierarchical Bayes (HB) method fits the assumed quadratic response models. Berger (1985), Gelman et al. (1995), and Carlin and Lewis (1996) discuss the basic notions of HB modeling. Basically, it embodies a complete (or full) Bayesian approach to the problem of estimating the unknown parameters (i.e., the unknown coefficients in the assumed quadratic response models) given the experimental data. In typical response models there are usually effects corresponding to random noise and/or signal factors in the models. Consequently, these factors are treated as random effects (as opposed to fixed (or non-random) control factor effects). As random factors, they of course also have unknown means and variances. Such unknown means and variances are known as hyperparameters in the response models.

The HB approach expresses initial uncertainty (i.e., uncertainty before the data are considered) about these unknown hyperparameters in the form of a so-called second-order (or hyperprior) distribution. It is almost always the case that such hyperprior distributions are taken to be diffuse (flat or non-informative) because very precise or informative information at the hyperprior level of such models is usually not available.

The solution to the HB method requires conditioning on the data and obtaining the so-called joint posterior distribution of all the parameters of interest. Suppose the data used and obtained in the physical experiment is denoted as the data vector Y and the vector of unknown coefficients in the response model of interest as θ. The posterior distribution is thus the conditional probability distribution $\pi(\theta|Y)$. Although not explicitly shown, the actual levels of the signal, control and noise factors used in the physical experimental design (the so-called design matrix X) are also present in the posterior distribution. Note that this posterior distribution captures the uncertainty in the state-of-knowledge about θ given all the available data Y. Henceforth, this undesired type of variation regarding the precise value of θ is designated as parameter uncertainty (or simply uncertainty).

Note that this component of overall variation in a response of interest is completely ignored if statistical uncertainty in the estimation of θ is disregarded and the estimated value is treated as though it were the true value. The Bayesian consideration and use of $\pi(\theta|Y)$ guarantees that parameter uncertainty will not be ignored. When using HB the posterior distribution is implicitly obtained using the modern statistical technique known as Markov Chain Monte Carlo (MCMC) simulation (see Gilks et al., 1996).

In contrast to parameter uncertainty, there is another major source of variation in the results. There is unavoidable random variation resulting from the combined effects of the random noise(s) and the inherent (natural) random variability in the response from each subprocess. This source of variability in the results is referred to herein as (natural) random variation. The variation propagation model presented below considers the combined as well as the individual contributions of the uncertainty and random variation in the response(s).

The HB MCMC approach herein is implemented using existing software that is available for free download from the internet. MCMC sampling has been conveniently implemented through the BUGS software project (Gilks et al., 1994), and is available at URL http://www.mrc-bsu.cam.ac.uk/bugs/. The classic BUGS program uses text-based model description and a command-line interface, and versions are available for major computing platforms.

A Windows version is also available, called WinBUGS®, which is extremely user-friendly. It has an optional graphical user interface (called DoodleBUGS®) as well as on-line monitoring and convergence diagnostics. The actual WinBUGS® code used to obtain the required posterior distributions, and thus the estimates of the unknown coefficients in each assumed response model, is provided in Appendices A, B, and C.

Subprocess A

The experimental data considered for subprocess A is actual data obtained from a disposable diaper side panel laminate robust design optimization study. However, the precise identification of the signal and control factors, as well as the response, is unnecessary and will not be discussed here.

Each of the four control factors in subprocess A were considered at three levels, which were coded simply as −1,0, and 1. Also, the signal factor $M_A(1)$ was likewise considered at three levels, which were coded as −1, 0, and 1. A $3^{5-2}$ fractional factorial design was considered with 24 replications; thus, a total of 648 observations were taken. The first replicate of the experiment is shown in Table 1.

TABLE 1

First Replicate of the Subprocess A Experiment

| $X_A(1)$ | $X_A(2)$ | $X_A(3)$ | $X_A(4)$ | $M_A(1)$ | $y_A$ |
|---|---|---|---|---|---|
| −1 | −1 | −1 | 1 | −1 | 81.6 |
| −1 | −1 | −1 | 1 | 0 | 112.6 |
| −1 | −1 | −1 | 1 | 1 | 120 |
| 0 | 0 | 0 | 1 | −1 | 84.2 |
| 0 | 0 | 0 | 1 | 0 | 92.4 |
| 0 | 0 | 0 | 1 | 1 | 162.4 |
| 1 | 1 | 1 | 1 | −1 | 76.3 |
| 1 | 1 | 1 | 1 | 0 | 123.4 |
| 1 | 1 | 1 | 1 | 1 | 173.3 |
| −1 | 0 | 1 | 0 | −1 | 84.6 |
| −1 | 0 | 1 | 0 | 0 | 96.9 |
| −1 | 0 | 1 | 0 | 1 | 105.4 |
| 0 | 1 | −1 | 0 | −1 | 64.4 |
| 0 | 1 | −1 | 0 | 0 | 84.7 |
| 0 | 1 | −1 | 0 | 1 | 131.3 |
| 1 | −1 | 0 | 0 | −1 | 89.5 |
| 1 | −1 | 0 | 0 | 0 | 134.3 |
| 1 | −1 | 0 | 0 | 1 | 182.9 |
| −1 | 1 | 0 | −1 | −1 | 79.5 |
| −1 | 1 | 0 | −1 | 0 | 91.8 |
| −1 | 1 | 0 | −1 | 1 | 143.7 |
| 0 | −1 | 1 | −1 | −1 | 80.9 |
| 0 | −1 | 1 | −1 | 0 | 113.7 |
| 0 | −1 | 1 | −1 | 1 | 162.4 |
| 1 | 0 | −1 | −1 | −1 | 85.4 |
| 1 | 0 | −1 | −1 | 0 | 104.5 |
| 1 | 0 | −1 | −1 | 1 | 143.6 |

Suppose the usual assumption is made that $$y_A \sim N(\mu_A, \sigma_A^2) \quad (1)$$

That is, the response $y_A$ follows a normal distribution with mean $\mu_A$ and variance $\sigma_A^2$.

A response mode for both $\mu_A$ and $\log(\sigma_A^2)$ is considered that is a quadratic function of the signal and control factors along with corresponding interaction (or cross-product) terms; namely, $\mu_A = \alpha_{A0} + \alpha_{A1}X_{A1} + \alpha A2 X_{A2} + X_{A3} + X_{A3} + \alpha_{A4}X_{A4}$ $+ \alpha_{A11}X_{A1}^2 + \alpha_{A22}X_{A2}^2 + \alpha_{A33}X_{A3}^2 + \alpha_{A44}X_{A4}^2$ $+ \beta_{A1}M_{A1} + \beta_{A11}M_{A1}^2 + \alpha\beta_{A2.1}X_{A2}M_{A1}$ $+ \alpha\beta_{A3.1}X_{A3}M_{A1} + \alpha\beta_{A4.1}X_{A4}M_{A1} + \alpha\beta_{A11.1}X_{A1}^2M_{A1} + \alpha\beta_{A22.1}X_{A2}^2M_{A1}$ $+ \alpha\beta_{A33.1}X_{A3}^2M_{A1}^2 + \alpha\beta_{A4.11}X_{A4}M_{A1}^2 + \alpha\beta_{A1.11}X_{A1}M_{A1}^2 + \alpha\beta_{A2.11}X_{A2}^2M_{A1}^2$ $+ \alpha\beta_{A3.11}X_{A3}M_{A1}^2 + \alpha\beta_{A4.11}X_{A4}M_{A1}^2 + \alpha\beta_{A11.11}X_{A1}^2M_{A1}^2 + \alpha\beta_{A22.11}X_{A2}^2M_{A1}^2$ $+ \alpha\beta_{A33.11}X_{A3}^2M_{A1}^2 + \alpha\beta_{A44.11}X_{A4}^2M_{A1}^2, \quad (2)$ For simplicity, multiple factors of a given type are indicated using subscripts; e.g., $X_{A1} \equiv X_A(1)$; $M_{A1} \equiv M_A(1)$; etc.

Also, $\log(\sigma_A^2) = \eta_{A0} + \eta_{A1}X_{A1} + \eta_{A2}X_{A2} + \eta_{A3}X_{A3} + \eta_{A4}X_{A4}$ $+ \eta_{A11}X_{A1}^2 + \eta_{A22}X_{A2}^2 + N_{A33}X_{A3}^2 + \eta_{A44}X_{A4}^2$ $+ \kappa_{A1}M_{A1} + \kappa_{A11}M_{A1}^2 + \eta\kappa_{A2.1}X_{A2}M_{A1}$ $+ \eta\kappa_{A3.1}X_{A3}M_{A1} + \eta\kappa_{A4.1}X_{A4}M_{A1} + \eta\kappa_{A11.1}X_{A1}^2M_{A1} + \eta\kappa_{A22.1}X_{A2}^2M_{A1}$ $+ \eta\kappa_{A33.1}X_{A3}^2M_{A1} + \eta\kappa_{A44.1}X_{A4}^2M_{A1} + \eta\kappa_{A411.11}X_{A1}^2M_{A1}^2 + \eta\kappa_{A2.11}X_{A2}^2M_{A1}^2$ $+ \eta\kappa_{A3.11}X_{A3}M_{A1}^2 + \eta\kappa_{A4.11}X_{A4}M_{A1}^2 + \eta\kappa_{A11.11}X_{A1}^2M_{A1}^2 + \eta\kappa_{A22.11}X_{A2}^2M_{A1}^2$ $+ \eta\kappa_{A33.11}X_{A3}^2M_{A1}^2 + \eta\kappa_{A44.11}X_{A4}^2M_{A1}^2. \quad (3)$ Note that Equations (2) and (3) each have 27 unknown coefficients (parameters $\alpha_x$, $\beta_x$, $\alpha\beta_x$, $\eta_x$, $\kappa_x$, $\eta\kappa_x$) that must be estimated from the data in Table 1. The form of Equation (3) also guarantees positive predicted variances. Note also that the experimental design used did not permit control factor by control factor interactions to be included in the models. If the design had allowed such effects to be included, then terms such as $X_{A1}X_{A2}$ would have appeared in Equations (2) and (3).

Appendix 1 contains the WinBUGS® code used to fit both $\mu_A$ and $\log(\sigma_A^2)$. Note that the data in Table 1, along with the data for the 23 remaining replicates, serves as input data for executing the code in Appendix 1. Only the first replicate is given with its corresponding 27 covariate values (i.e., 1 for the intercept and the 26 covariates corresponding to the 26 regression parameters in Equations (2) and (3)). Note also the specification of informative, but diffuse, prior distributions (under Model) and the zero initial values for the 54 parameters (under Inits) in Appendix 1. The Model parameters relate the data in Table 1 to the Gaussian mean and variance in Equation (1) through Equations (2) and (3). The final output obtained by executing the WinBUGS® code in Appendix 1 is shown in Table 2. The moments and quantiles in Table 2 were all calculated from 10,000 random MCMC draws from the joint 27 (coefficients)×2 (models)=54-dimensional joint posterior distribution, given the data in Table 1. Table 3 gives two of the 10,000 posterior draws for the 54 parameters in the WinBUGS format: "betaA" and "gamA" refer to the regression coefficients in Equations (2) and (3), respectively.

TABLE 2

WinBUGS® Output from Fitting the Subprocess A Experimental Data

| Node | Mean | SD | MC Error | 2.5% | 5.0% | Median | 95.0% | 97.5% |
|---|---|---|---|---|---|---|---|---|
| beta[1] | 83.33 | 2.699 | 0.1957 | 78.15 | 78.87 | 83.3 | 87.82 | 88.81 |
| beta[2] | −0.3759 | 1.336 | 0.04857 | −2.885 | −2.517 | −0.3927 | 1.87 | 2.29 |
| beta[3] | 6.059 | 2.042 | 0.1018 | 1.978 | 2.678 | 6.027 | 9.464 | 10.13 |

TABLE 2-continued

WinBUGS ® Output from Fitting the Subprocess A Experimental Data

| Node | Mean | SD | MC Error | 2.5% | 5.0% | Median | 95.0% | 97.5% |
|---|---|---|---|---|---|---|---|---|
| beta[4] | −1.659 | 1.462 | 0.05206 | −4.504 | −4.063 | −1.632 | 0.7317 | 1.186 |
| beta[5] | 3.059 | 1.986 | 0.09342 | −0.9415 | −0.2112 | 3.062 | 6.306 | 6.912 |
| beta[6] | 3.717 | 1.17 | 0.03256 | 1.435 | 1.784 | 3.726 | 5.643 | 6.012 |
| beta[7] | −1.536 | 2.462 | 0.1464 | −6.112 | −5.404 | −1.588 | 2.622 | 3.412 |
| beta[8] | −1.225 | 1.328 | 0.05228 | −3.897 | −3.434 | −1.21 | 0.9377 | 1.345 |
| beta[9] | 9.741 | 2.314 | 0.1505 | 5.277 | 5.973 | 9.737 | 13.55 | 14.23 |
| beta[10] | 27.34 | 2.33 | 0.121 | 22.7 | 23.47 | 27.37 | 31.08 | 31.85 |
| beta[11] | 3.824 | 3.452 | 0.2633 | −3.361 | −1.955 | 3.812 | 9.367 | 10.33 |
| beta[12] | 4.828 | 0.9487 | 0.01671 | 2.95 | 3.266 | 4.825 | 6.391 | 6.696 |
| beta[13] | 6.069 | 1.633 | 0.05631 | 2.798 | 3.311 | 6.116 | 8.688 | 9.158 |
| beta[14] | −3.583 | 1.626 | 0.05621 | −6.743 | −6.221 | −3.584 | −0.9174 | −0.3692 |
| beta[15] | −1.659 | 2.586 | 0.1331 | −6.606 | −5.858 | −1.696 | 2.764 | 3.635 |
| beta[16] | −2.6 | 1.007 | 0.018 | −4.579 | −4.268 | −2.583 | −0.9515 | −0.631 |
| beta[17] | −0.7749 | 1.779 | 0.06363 | −4.281 | −3.679 | −0.7684 | 2.177 | 2.689 |
| beta[18] | 6.368 | 1.563 | 0.05201 | 3.305 | 3.821 | 6.371 | 8.948 | 9.421 |
| beta[19] | 0.5075 | 2.512 | 0.1239 | −4.368 | −3.613 | 0.509 | 4.623 | 5.448 |
| beta[20] | 3.078 | 0.9386 | 0.01493 | 1.22 | 1.518 | 3.084 | 4.597 | 4.903 |
| beta[21] | 0.8013 | 1.487 | 0.04231 | −2.197 | −1.643 | 0.8103 | 3.24 | 3.738 |
| beta[22] | −5.459 | 1.657 | 0.05862 | −8.756 | −8.21 | −5.459 | −2.752 | −2.245 |
| beta[23] | −1.466 | 2.854 | 0.1696 | −7.166 | −6.249 | −1.398 | 3.159 | 3.929 |
| beta[24] | −1.364 | 0.9428 | 0.01539 | −3.228 | −2.91 | −1.363 | 0.1938 | 0.4876 |
| beta[25] | 1.178 | 1.604 | 0.06044 | −1.917 | −1.419 | 1.142 | 3.86 | 4.421 |
| beta[26] | 3.877 | 1.689 | 0.0684 | 0.662 | 1.196 | 3.865 | 6.687 | 7.223 |
| beta[27] | −0.584 | 2.897 | 0.1911 | −6.336 | −5.377 | −0.5983 | 4.192 | 5.137 |
| gam[1] | 5.127 | 0.285 | 0.02478 | 4.573 | 4.652 | 5.115 | 5.63 | 5.711 |
| gam[2] | −0.1261 | 0.1154 | 0.005875 | −0.354 | −0.3153 | −0.1267 | 0.06348 | 0.1039 |
| gam[3] | 0.1616 | 0.194 | 0.01391 | −0.2201 | −0.1558 | 0.1642 | 0.4898 | 0.5376 |
| gam[4] | 0.00468 | 0.1219 | 0.005313 | −0.2535 | −0.1993 | 0.005471 | 0.2015 | 0.2379 |
| gam[5] | 0.6634 | 0.2357 | 0.01887 | 0.2191 | 0.2915 | 0.6584 | 1.067 | 1.165 |
| gam[6] | 0.1218 | 0.1245 | 0.006665 | −0.1263 | −0.08902 | 0.1261 | 0.3142 | 0.357 |
| gam[7] | −0.3609 | 0.1993 | 0.01469 | −0.7458 | −0.6865 | −0.3647 | −0.03094 | 0.02174 |
| gam[8] | −0.2438 | 0.12 | 0.005774 | −0.4802 | −0.436 | −0.2471 | −0.04415 | −0.002312 |
| gam[9] | −0.1144 | 0.1997 | 0.01491 | −0.4817 | −0.43 | −0.1187 | 0.2202 | 0.2775 |
| gam[10] | 0.7284 | 0.2267 | 0.0158 | 0.2989 | 0.3592 | 0.7325 | 1.107 | 1.177 |
| gam[11] | −0.0844 | 0.3503 | 0.03077 | −0.8314 | −0.7195 | −0.06539 | 0.4471 | 0.5386 |
| gam[12] | 0.212 | 0.08792 | 0.002033 | 0.03547 | 0.06536 | 0.2123 | 0.3586 | 0.3879 |
| gam[13] | 0.2282 | 0.1434 | 0.007153 | −0.05151 | −0.01 | 0.2332 | 0.4662 | 0.5179 |
| gam[14] | −0.0906 | 0.1533 | 0.007358 | −0.3893 | −0.3483 | −0.0902 | 0.1567 | 0.2027 |
| gam[15] | −0.0981 | 0.2379 | 0.01712 | −0.5446 | −0.4814 | −0.1025 | 0.2954 | 0.3849 |
| gam[16] | 0.1753 | 0.08657 | 0.001853 | 0.00118 | 0.03215 | 0.1761 | 0.3178 | 0.3467 |
| gam[17] | −0.2015 | 0.1498 | 0.006688 | −0.4894 | −0.4456 | −0.2046 | 0.05533 | 0.1096 |
| gam[18] | −0.0923 | 0.1506 | 0.00707 | −0.3813 | −0.3344 | −0.09471 | 0.1597 | 0.2034 |
| gam[19] | −0.3152 | 0.2904 | 0.02335 | −0.8905 | −0.8014 | −0.3094 | 0.1553 | 0.2372 |
| gam[20] | −0.0764 | 0.087 | 0.002308 | −0.2527 | −0.2201 | −0.07752 | 0.06251 | 0.08602 |
| gam[21] | −0.0995 | 0.1524 | 0.007842 | −0.39 | −0.3392 | −0.1041 | 0.1603 | 0.2078 |
| gam[22] | −0.0774 | 0.1496 | 0.00755 | −0.3703 | −0.3184 | −0.08146 | 0.174 | 0.2205 |
| gam[23] | 0.3234 | 0.2563 | 0.01904 | −0.1945 | −0.09691 | 0.3095 | 0.7446 | 0.8202 |
| gam[24] | 0.1375 | 0.08642 | 0.002037 | −0.03517 | −0.0034 | 0.1355 | 0.2798 | 0.3075 |
| gam[25] | 0.247 | 0.1473 | 0.007025 | −0.02737 | 0.00987 | 0.2473 | 0.4943 | 0.5421 |
| gam[26] | 0.1593 | 0.1526 | 0.007015 | −0.1595 | −0.08974 | 0.1606 | 0.4016 | 0.4517 |
| gam[27] | 0.06888 | 0.2399 | 0.01736 | −0.4048 | −0.3376 | 0.07048 | 0.465 | 0.526 |

TABLE 3

Two WinBUGS ® Posterior Draws from Fitting the Subprocess A Data

```
. . .
betaA=structure(.Data = c(84.79, −1.391, 5.839, −0.4638, −0.04058,
    3.033, 0.6528, −0.5753,
    .911, 24.8. 3.39, 5.98, 7.768, −4.317, −3.237, −2.339, −1.44, 9.031,
    5.786, 4.202,
    1.968, −3.43, −3.949, −2.079, 0.7155, 5.493, −0.7198, 84.46,
    −0.8472, 5.703, −0.7473,
    −0.2383, 4.975, −0.4081, −2.301, 9.397, 23.84. 4.887, 4.733, 6.566,
    −3.817, −4.222,
    −2.97, −1.827, 8.101, 5.11, 5.036, 0.2489, −4.119, −2.549,
    −1.456, 2.047, 7.293, −1.036,
    . . . ), .Dim = c(10000,27)),
gamA=structure(.Data = c(5.138, −0.1951, −0.02245, −0.009476,
    0.8535, 0.09199, −0.2574,
    −0.4641, −0.3387, 0.8911, −0.3513, 0.1331, 0.4421, −0.3742,
    −0.1461, 0.1619, −0.2367,
    −0.03346, −0.3571, −0.08355, −0.1385, −0.1543, 0.4838,
    0.07801, 0.3672, 0.202,
    0.3614, 5.138, −0.1951, 0.1117, 0.07473, 0.8535, 0.09199,
    −0.2574, −0.4641, −0.3387,
    0.8911, −0.3262, 0.1875, 0.4421, −0.3742, −0.1461,
    0.1619, −0.2367, −0.03346,
    −0.3571, −0.08355, −0.1385, −0.1543, 0.3182, 0.07801,
    0.3672, 0.202, 0.3614,
    . . . ), .Dim = c(10000,27)),
```

The posterior draws in Table 3 reflect the state-of-knowledge uncertainty in fitting both models given the limited statistical data in Table 1. As described in Section 3, the joint 54-dimensional posterior draws in the full version of Table 3 will be used in Step 2 of the procedure of the present invention.

Taking the (posterior) mean values shown in Table 2 as point estimates of the unknown coefficients, the fitted model for the mean response $\mu_A$ becomes $$\mu_A = 83.33 - 0.3759 X_{A1} + 6.059 X_{A2} - 1.659 X_{A3} + 3.059 X_{A4}$$

$$+ 3.717 X_{A1}^2 - 1.536 X_{A2}^2 - 1.225 X_{A3}^2 + 9.741 X_{A4}^2$$

$$+ 27.34 M_{A1} + 3.824 M_{A1}^2 + 4.828 X_{A1} M_{A1} + 6.069 X_{A2} M_{A1}$$

$$- 3.583 X_{A3} M_{A1} - 1.659 X_{A4} M_{A1} - 2.6 X_{A1}^2 M_{A1} - 0.7749 X_{A2}^2 M_{A1}$$

$$+ 6.368 X_{A3}^2 M_{A1} + 0.5075 X_{A4}^2 M_{A1} + 3.078_{A1} M_{A1}^2 + 0.8013 X_{A2} M_{A1}^2$$

$$- 5.459 X_{A3} M_{A1}^2 - 1.466 X_{A4} M_{A1}^2 - 1.364 X_{A1}^2 M_{A1}^2 + 1.178 X_{A2}^2 M_{A1}^2$$

$$+ 3.877 X_{A3}^2 M_{A1}^2 - 0.584 X_{A4}^2 M_{A1}^2 \quad (4)$$

Similarly, using the remaining mean values shown in Appendix 1, the fitted model for the response variance $\sigma_A^2$ becomes $$\log(\sigma_A^2) = 5.127 - 0.1261 X_{A1} + 0.1616 X_{A2} + 0.004675 X_{A3} + 0.6634 X_{A4}$$

$$+ 0.1218 X_{A1}^2 - 0.3609 X_{A2}^2 - 0.2438 X_{A3}^2 - 0.1144 X_{A4}^2$$

$$+ 0.7284 M_{A1} - 0.08436 M_{A1}^2 + 0.212 X_{A1}^2 M_{A1} + 0.2282 X_{A2} M_{A1}$$

$$- 0.09056 X_{A3} M_{A1} - 0.09814 X_{A4} M_{A1} + 0.1753 X_{A1}^2 M_{A1} - 0.2015 X_{A2}^2 M_{A1}$$

$$+ 0.09232 X_{A3}^2 M - 0.3152 X_{A4}^2 M_{A1} - 0.07639 X_{A1} M_{A1}^2 - 0.0995 X_{A2} M_{A1}^2$$

$$- 0.07744 X_{A3} M_{A1}^2 + 0.3234 X_{A4} M_{A1}^2 + 0.1375 X_{A1}^2 M_{A1}^2 + 0.247 X_{A2}^2 M_{A1}^2$$

$$+ 0.1593 X_{A3}^2 M_{A1}^2 + 0.06888 X_{A4}^2 M_{A1}. \quad (5)$$

Subprocess B

Now consider subprocess B. From FIG. 2 there are two noise factors, one signal factor and one control factor. The control and signal factors were each considered at three levels, which again were coded simply as −1, 0, and 1. The noise factors were each considered at two levels, which were coded as −1 and 1. A 36-run full factorial design was considered with 10 replications; thus, a total of 360 observations were taken. The first replicate of the experiment is shown in Table 4.

TABLE 4

| First Replicate of the Subprocess B Experiment | | | | |
|---|---|---|---|---|
| $X_B(1)$ | $M_B(1)$ | $N_B(1)$ | $N_B(2)$ | $y_B$ |
| −1 | −1 | −1 | −1 | 1.02223138 |
| −1 | 0 | −1 | −1 | 3.30380246 |
| −1 | 1 | −1 | −1 | 2.96783207 |
| 0 | −1 | −1 | −1 | −1.7110314 |
| 0 | 0 | −1 | −1 | 1.01778769 |
| 0 | 1 | −1 | −1 | 4.99248832 |
| 1 | −1 | −1 | −1 | −3.5237026 |
| 1 | 0 | −1 | −1 | −1.8885062 |
| 1 | 1 | −1 | −1 | 2.34965825 |
| −1 | −1 | −1 | 1 | −3.3546902 |
| −1 | 0 | −1 | 1 | −2.722298 |
| −1 | 1 | −1 | 1 | 0.92969836 |
| 0 | −1 | −1 | 1 | −2.6510446 |
| 0 | 0 | −1 | 1 | 0.59033547 |
| 0 | 1 | −1 | 1 | 5.28626072 |
| 1 | −1 | −1 | 1 | 0.80470511 |
| 1 | 0 | −1 | 1 | 4.95036383 |

TABLE 4-continued

| First Replicate of the Subprocess B Experiment | | | | |
|---|---|---|---|---|
| $X_B(1)$ | $M_B(1)$ | $N_B(1)$ | $N_B(2)$ | $y_B$ |
| 1 | 1 | −1 | 1 | 12.0015966 |
| −1 | −1 | 1 | −1 | −2.7410663 |
| −1 | 0 | 1 | −1 | 1.24323219 |
| −1 | 1 | 1 | −1 | 4.00819706 |
| 0 | −1 | 1 | −1 | −2.7838092 |
| 0 | 0 | 1 | −1 | 2.28396153 |
| 0 | 1 | 1 | −1 | 7.60048218 |
| 1 | −1 | 1 | −1 | −2.0311124 |
| 1 | 0 | 1 | −1 | 4.67051824 |
| 1 | 1 | 1 | −1 | 9.68491548 |
| −1 | −1 | 1 | 1 | −6.1160108 |
| −1 | 0 | 1 | 1 | −1.1553243 |
| −1 | 1 | 1 | 1 | 2.8674194 |
| 0 | −1 | 1 | 1 | −3.4844926 |
| 0 | 0 | 1 | 1 | 2.60820652 |
| 0 | 1 | 1 | 1 | 9.79463764 |
| 1 | −1 | 1 | 1 | 2.06027307 |
| 1 | 0 | 1 | 1 | 8.51261838 |
| 1 | 1 | 1 | 1 | 18.3251973 |

As in subprocess A, assume that $$y_B \sim N(\mu_B, \sigma_B^2), \quad (6)$$

Again, consider quadratic response models for both $\mu_B$ and $\log(\sigma_B^2)$. Thus, each model has 13 terms whose coefficients must be estimated. WinBUGS® is used to obtain the required estimates of the coefficients in each response model, as for subprocess A.

Appendix 2 contains the WinBUG® code used to fit both $\mu_B$ and $\log(\sigma_B^2)$. Note that the data in Table 4 (and the 9 other replicates) serves as input data for executing the code in Appendix 2. Only the first replicate is given with its corresponding 13 covariate values (i.e., 1 for the intercept and the 12 covariates corresponding to the 12 regression parameters in the model).

The final output obtained by executing the WinBUGS® code in Appendix 2 is shown in Table 5. The moments and quantiles in Table 5 were all calculated from 10,000 random MCMC draws from the joint 13 (coefficients)×2 (models)= 26-dimensional joint posterior distribution, given the data in Table 4. Table 6 gives two of the 10,000 posterior draws for the 26 parameters in the WinBUGS® format; again "betaB" and "gamB" refer to the regression coefficients in the model, respectively.

TABLE 5

WinBUGS ® Output from Fitting the Subprocess B Experimental Data

| Node | Mean | SD | MC Error | 2.5% | 5.0% | Median | 95.0% | 97.5% |
|---|---|---|---|---|---|---|---|---|
| Beta[1] | 1.078 | 0.1204 | 0.003857 | 0.8415 | 0.8807 | 1.08 | 1.274 | 1.313 |
| Beta[2] | 1.935 | 0.07574 | 0.001462 | 1.789 | 1.81 | 1.935 | 2.059 | 2.083 |
| Beta[3] | 0.8815 | 0.1131 | 0.003199 | 0.6666 | 0.6968 | 0.8816 | 1.067 | 1.109 |
| Beta[4] | 3.91 | 0.07473 | 0.001272 | 3.762 | 3.787 | 3.91 | 4.032 | 4.055 |
| Beta[5] | 0.453 | 0.1186 | 0.003144 | 0.2254 | 0.2607 | 0.4522 | 0.6513 | 0.6861 |
| Beta[6] | 0.9896 | 0.08706 | 0.001419 | 0.8184 | 0.8474 | 0.9888 | 1.133 | 1.162 |
| Beta[7] | 0.5004 | 0.05821 | 8.73E−04 | 0.3868 | 0.4055 | 0.5003 | 0.5973 | 0.615 |
| Beta[8] | 0.4852 | 0.05851 | 8.40E−04 | 0.3693 | 0.3892 | 0.4856 | 0.5807 | 0.5993 |
| Beta[9] | 0.01221 | 0.05168 | 7.68E−04 | −0.087 | −0.0724 | 0.0129 | 0.0972 | 0.1128 |
| Beta[10] | 1.069 | 0.06543 | 8.86E−04 | 0.9395 | 0.9611 | 1.069 | 1.175 | 1.198 |
| Beta[11] | 2.013 | 0.0664 | 9.18E−04 | 1.881 | 1.902 | 2.014 | 2.12 | 2.139 |
| Beta[12] | 0.7286 | 0.06741 | 8.80E−04 | 0.5966 | 0.6173 | 0.7287 | 0.84 | 0.8609 |
| Beta[13] | 0.8116 | 0.06828 | 0.001137 | 0.6782 | 0.6974 | 0.8116 | 0.9243 | 0.9476 |
| Gam[1] | 0.09553 | 0.1803 | 0.01004 | −0.235 | −0.1895 | 0.09335 | 0.3981 | 0.4586 |
| Gam[2] | 0.3694 | 0.09678 | 0.002292 | 0.1848 | 0.2146 | 0.3696 | 0.5274 | 0.562 |
| Gam[3] | 0.0583 | 0.1726 | 0.008566 | −0.29 | −0.242 | 0.06339 | 0.3386 | 0.4 |
| Gam[4] | 0.6427 | 0.09639 | 0.002138 | 0.4496 | 0.4855 | 0.6448 | 0.8027 | 0.8356 |
| Gam[5] | −0.0959 | 0.1705 | 0.00834 | −0.435 | −0.398 | −0.0885 | 0.1699 | 0.2151 |
| Gam[6] | 0.323 | 0.1212 | 0.002623 | 0.0845 | 0.1276 | 0.3239 | 0.5214 | 0.5587 |
| Gam[7] | 0.02492 | 0.08081 | 0.002284 | −0.133 | −0.1083 | 0.02491 | 0.155 | 0.1857 |
| Gam[8] | 0.06195 | 0.07822 | 0.001993 | −0.089 | −0.0624 | 0.06136 | 0.1908 | 0.2203 |
| Gam[9] | −0.1486 | 0.08296 | 0.002579 | −0.308 | −0.2853 | −0.147 | −0.0117 | 0.01299 |
| Gam[10] | −0.1217 | 0.09864 | 0.00252 | −0.311 | −0.2811 | −0.1224 | 0.03942 | 0.06971 |
| Gam[11] | −0.126 | 0.09595 | 0.002167 | −0.306 | −0.2776 | −0.1246 | 0.03146 | 0.06974 |
| Gam[12] | −0.1428 | 0.0986 | 0.002909 | −0.331 | −0.3041 | −0.1413 | 0.01636 | 0.05225 |
| Gam[13] | 0.1516 | 0.09848 | 0.002871 | −0.042 | −0.0133 | 0.1522 | 0.3132 | 0.3433 |

TABLE 6

Some WinBUGS ® Posterior Draws from Fitting the Subprocess B Data

...
betaB=structure(.Data = c(
 1.299, 1.822, 0.6334, 3.92, 0.3652, 0.9233, 0.5788, 0.4527, 0.08808,
 1.074, 1.904,
 0.7932, 0.8481, 1.312, 1.808, 0.6383, 3.842, 0.3791, 0.8757,
 0.5207, 0.4903,
 0.02009, 1.092, 1.948, 0.7441, 0.8251, . . . ),
 .Dim = c(10000,13)),
gamB=structure(.Data = c(
 0.037, 0.47, 0.1925, 0.7034, −0.1048, 0.2394. 0.0878, 0.23,
 −0.0753, −0.05354,
 −0.05713, −0.09432. 0.1136, 0.037, 0.47, 0.1925, 0.7034, −0.1048,
 0.1559, 0.0878, 0.1642,
 −0.0753, 0.02423, −0.05713, 0.1079, 0.1136, . . . ),
 .Dim =c(10000,13)), The fitted model for the mean response $\mu_B$ becomes $$\mu_B = 1.078 + 1.935 X_{B1} + 0.8815 X_{B1}^2 + 3.91 M_{B1} + 0.453 M_{B1}^2$$
$$+ 0.9896 X_{B1} M_{B1} + 0.5004 N_{B1} + 0.4852 N_{B2} + 0.01221 N_{B1} N_{B2}$$
$$+ 1.069 X_{B1} N_{B1} + 2.013 X_{B1} N_{B2} + 0.7286 M_{B1} N_{B1} + 0.8116 M_{B1} N_{B2}, \quad (7)$$

while the fitted model for $\sigma_B^2$ becomes $$\log(\sigma_B^2) = 0.09553 + 0.3694 X_{B1} + 0.0583 X_{B1}^2 + 0.6427 M_{B1} - 0.09586 M_{B1}^2$$
$$+ 0.323 X_{B1} M_{B1} + 0.02492 N_{B1} + 0.06195 N_{B2} - 0.1486 N_{B1} N_{B2}$$
$$-0.1217 X_{B1} N_{B1} - 0.126 X_{B1} N_{B2} - 0.1428 M_{B1} N_{B1} + 0.1516 M_{B1} N_{B2}. \quad (8)$$

Subprocess C

Finally consider subprocess C. In FIG. 2, for subprocess C, there are two control factors, two signal factors, and a single noise factor. Each factor was considered at 2 levels, which were again coded as −1 and 1. A full $2^5$ factorial design was considered with 20 replicates (640 total observations). Table 7 contains the results for the first replicate of the experiment.

TABLE 7

First Replicate of the Subprocess C Experiment

| $X_C(1)$ | $X_C(2)$ | $M_C(1)$ | $M_C(2)$ | $N_C(1)$ | $y_C$ |
|---|---|---|---|---|---|
| −1 | −1 | −1 | −1 | −1 | 5.67095855 |
| 1 | −1 | −1 | −1 | −1 | 7.77692105 |
| −1 | 1 | −1 | −1 | −1 | 8.08412994 |
| 1 | 1 | −1 | −1 | −1 | 6.50753842 |
| −1 | −1 | 1 | −1 | −1 | 7.19725993 |
| 1 | −1 | 1 | −1 | −1 | 13.5090289 |
| −1 | 1 | 1 | −1 | −1 | 10.6134513 |
| 1 | 1 | 1 | −1 | −1 | 13.5178809 |
| −1 | −1 | −1 | −1 | 1 | −2.1780616 |
| 1 | −1 | −1 | −1 | 1 | 7.32776159 |
| −1 | 1 | −1 | −1 | 1 | 4.8390484 |
| 1 | 1 | −1 | −1 | 1 | 15.0851539 |
| −1 | −1 | 1 | −1 | 1 | 2.5819532 |
| 1 | −1 | 1 | −1 | 1 | 15.715576 |
| −1 | 1 | 1 | −1 | 1 | 6.97454349 |
| 1 | 1 | 1 | −1 | 1 | 17.6209886 |
| −1 | −1 | −1 | 1 | −1 | 3.81833769 |
| 1 | −1 | −1 | 1 | −1 | 11.1183842 |
| −1 | 1 | −1 | 1 | −1 | 6.45607791 |
| 1 | 1 | −1 | 1 | −1 | 16.5609883 |
| −1 | −1 | 1 | 1 | −1 | 5.88295579 |
| 1 | −1 | 1 | 1 | −1 | 15.3090985 |
| −1 | 1 | 1 | 1 | −1 | 8.09559321 |
| 1 | 1 | 1 | 1 | −1 | 19.7920472 |
| −1 | −1 | −1 | 1 | 1 | −0.1133644 |
| 1 | −1 | −1 | 1 | 1 | 13.5484679 |
| −1 | 1 | −1 | 1 | 1 | 6.24418387 |
| 1 | 1 | −1 | 1 | 1 | 16.239229 |
| −1 | −1 | 1 | 1 | 1 | 1.60911918 |
| 1 | −1 | 1 | 1 | 1 | 19.0614151 |
| −1 | 1 | 1 | 1 | 1 | 8.79527923 |
| 1 | 1 | 1 | 1 | 1 | 25.9413224 |

Again, assume that $$y_c \sim N(\mu_c, \sigma_c^2). \quad (9)$$

The design described above restricts consideration to linear response models for $\mu_c$ and $\log(\sigma_c^2)$ because only two levels of each factor are considered. Each model thus has 16 terms whose coefficients must be estimated. Again, WinBUGS® is used to obtain the required estimates of the coefficients in each linear response model.

Appendix 3 contains the WinBUGS® code used to fit both $\mu_c$ and $\log(\sigma_c^2)$. Note that the data in Table 7 (and the 19 other replicates) serves as input data for executing the code in Appendix 3. Only the first replicate is given with its corresponding 16 covariate values (i.e., 1 for the intercept and the 15 covariates corresponding to the 15 regression parameters in the model).

The final output obtained by executing the WinBUGS® code in Appendix 3 is shown in Table 8. The moments and quantiles in Table 8 were all calculated from 10,000 random MCMC draws from the joint 16 (coefficients)×2 (models)= 32-dimensional joint posterior distribution, given the data in Table 7. Table 9 gives two of the 10,000 posterior draws for the 32 parameters in the WinBUGS® format, where "betaC" and "gamC" similarly refer to the regression coefficients in the model, respectively.

TABLE 9

Two WinBUGS Posterior Draws From Fitting Subprocess C Experimental Data

```
betaC=structure(.Data = c(
    10.08, 4.979, 2.107, -0.01716, 1.999, 1.049, -0.02399, 1,
    0.01036, 1.066, 0.08446,
    0.003115, 1.959, 0.9962, 0.5737, 0.7233, 10.09, 5, 2.058,
    -0.04041, 1.978, 1.025,
    -0.01392, 0.9561, 0.03269, 0.9775, 0.1084, 0.06063, 1.988, 1.027,
    0.4966, 0.7137.
    ... ), .Dim = c(10000,16)),
gamC=structure(.Data = c(
    -0.01137, 0.4514, 0.9054, 0.4613, -0.06307, -0.08902,
    0.1343, -0.02484, -0.01888,
    -0.1152, 0.07899, 0.07578, 0.04547, 0.05203, -0.01941. 0.1376,
    -0.01137, 0.4514,
    0.9054, 0.4613, -0.08305, -0.08902, 0.1343, -0.02484,
    -0.01888, -0.1152, 0.07899,
    -0.05623, 0.04547, -0.1091, -0.01941, 0.1376,
    ... ), .Dim = c(10000,16)),
```

The corresponding fitted linear model for the mean response $\mu_c$ becomes $$\mu_C = 9.961 + 4.901 X_{c1} + 1.977 X_{c2} - 0.1252 X_{c1} X_{c2} + 1.989 M_{c1}$$
$$+ 1.016 M_{c2} - 0.02026 M_{c1} M_{c2} + 0.9881 X_{c1} M_{c1} + 0.04363 X_{c2} M_{c1}$$
$$+ 1.013 X_{c2} N_{c1} + 0.5237 M_{c1} N_{c1} + 0.7039 M_{c2} N_{c1}, \quad (10)$$

and the fitted linear model for $\sigma_c^2$ becomes

TABLE 8

WinBUGS ® Output from Fitting the Subprocess C Experimental Data

| Node | Mean | SD | MC Error | 2.5% | 5.0% | Median | 95.0% | 97.5% |
|---|---|---|---|---|---|---|---|---|
| beta[1] | 9.961 | 0.05942 | 0.001674 | 9.843 | 9.863 | 9.961 | 10.06 | 10.08 |
| beta[2] | 4.901 | 0.05967 | 0.001737 | 4.782 | 4.803 | 4.901 | 4.998 | 5.016 |
| beta[3] | 1.977 | 0.05924 | 0.001678 | 1.861 | 1.878 | 1.977 | 2.074 | 2.094 |
| beta[4] | -0.1252 | 0.06006 | 0.00174 | -0.2452 | -0.2246 | -0.1251 | -0.02863 | -0.01051 |
| beta[5] | 1.989 | 0.04408 | 8.05E-04 | 1.903 | 1.916 | 1.989 | 2.061 | 2.075 |
| beta[6] | 1.016 | 0.04343 | 7.61E-04 | 0.9315 | 0.9445 | 1.017 | 1.087 | 1.1 |
| beta[7] | -0.02026 | 0.03291 | 3.80E-04 | -0.08464 | -0.07465 | -0.0203 | 0.03399 | 0.04442 |
| beta[8] | 0.9881 | 0.0349 | 4.76E-04 | 0.92 | 0.9315 | 0.9881 | 1.045 | 1.056 |
| beta[9] | 0.04363 | 0.0435 | 7.68E-04 | -0.03999 | -0.02682 | 0.04346 | 0.1154 | 0.1296 |
| beta[10] | 1.013 | 0.03487 | 4.52E-04 | 0.9441 | 0.9549 | 1.013 | 1.07 | 1.081 |
| beta[11] | 0.05546 | 0.04265 | 6.77E-04 | -0.0273 | -0.01521 | 0.05545 | 0.125 | 0.138 |
| beta[12] | -0.02075 | 0.04462 | 7.72E-04 | -0.1068 | -0.09327 | -0.02124 | 0.05228 | 0.06617 |
| beta[13] | 1.955 | 0.03476 | 4.91E-04 | 1.886 | 1.899 | 1.955 | 2.013 | 2.023 |
| beta[14] | 0.9389 | 0.04361 | 7.48E-04 | 0.854 | 0.8675 | 0.9388 | 1.011 | 1.025 |
| beta[15] | 0.5237 | 0.0338 | 4.12E-04 | 0.4584 | 0.4685 | 0.5234 | 0.58 | 0.5896 |
| beta[16] | 0.7039 | 0.03258 | 3.96E-04 | 0.6398 | 0.6507 | 0.7036 | 0.758 | 0.7687 |
| gam[1] | 0.04872 | 0.05797 | 0.001326 | -0.067 | -0.04912 | 0.0512 | 0.1436 | 0.1612 |
| gam[2] | 0.5136 | 0.05864 | 0.001512 | 0.4012 | 0.4206 | 0.5133 | 0.6105 | 0.634 |
| gam[3] | 0.9208 | 0.05874 | 0.001496 | 0.8051 | 0.8267 | 0.9198 | 1.018 | 1.04 |
| gam[4] | 0.4388 | 0.05767 | 0.001282 | 0.3271 | 0.3457 | 0.4385 | 0.5323 | 0.5521 |
| gam[5] | -0.07747 | 0.05627 | 0.001366 | -0.1883 | -0.1705 | -0.07852 | 0.01431 | 0.03256 |
| gam[6] | -0.00887 | 0.05933 | 0.001284 | -0.1244 | -0.1066 | -0.00783 | 0.08884 | 0.1066 |
| gam[7] | 0.09123 | 0.05747 | 0.001291 | -0.02444 | -0.003852 | 0.09035 | 0.1844 | 0.2049 |
| gam[8] | 0.04437 | 0.05794 | 0.001394 | -0.06801 | -0.05182 | 0.04473 | 0.1424 | 0.1559 |
| gam[9] | -0.07683 | 0.06043 | 0.001438 | -0.1912 | -0.1744 | -0.07795 | 0.02681 | 0.04311 |
| gam[10] | -0.02502 | 0.05638 | 0.001297 | -0.1372 | -0.1192 | -0.02439 | 0.06666 | 0.08415 |
| gam[11] | 0.07783 | 0.0573 | 0.00128 | -0.0359 | -0.01432 | 0.07723 | 0.1753 | 0.1962 |
| gam[12] | 0.05466 | 0.05948 | 0.001456 | -0.05782 | -0.04089 | 0.05429 | 0.155 | 0.1729 |
| gam[13] | 0.1063 | 0.05607 | 0.00135 | -0.00187 | 0.01517 | 0.1061 | 0.1993 | 0.2157 |
| gam[14] | 0.01259 | 0.05883 | 0.001626 | -0.1038 | -0.08259 | 0.01425 | 0.1081 | 0.1314 |
| gam[15] | -0.01071 | 0.05834 | 0.001335 | -0.1181 | -0.1065 | -0.01319 | 0.08791 | 0.1065 |
| gam[16] | -0.00925 | 0.05715 | 0.001245 | -0.121 | -0.1033 | -0.00769 | 0.08618 | 0.1015 |

$$\log(\sigma_c^2) = 0.04872 + 0.5136 X_{c1} + 0.9208 X_{c2} + 0.4388 X_{c1} X_{c2} - 0.07747 M_{c1}$$

$$-0.008868 M_{c2} + 0.09123 M_{c1} M_{c2} + 0.04437 X_{c1} M_{c1} - 0.07683 X_{c2} M_{c1}$$

$$-0.02502 X_{c1} M_{c2} + 0.07783 X_{c2} M_{c2} + 0.05466 N_{c1} + 0.1063 X_{c1} N_{c1}$$

$$+0.01259 X_{c2} N_{c1} - 0.01071 M_{c1} N_{c1} - 0.009254 M_{c2} N_{c1}, \quad (11)$$

Step 2—Propagating Uncertainty and Random Variation Through a Coupled Process The coupling between the subprocesses is clearly seen in FIG. 2. For example, the output $y_A$ from subprocess A becomes the second noise factor, $N_B(2)$, for subprocess B as well as the first signal factor, $M_c(1)$, for subprocess C. Such coupling is easily captured using WinBUGS® in which the response models from all three subprocesses are represented. In addition, such coupling also introduces statistical correlation between the subprocesses, which is also naturally accommodated within WinBUGS®. This correlation is captured because the same random draws are used in each Monte Carlo replication. For example, in each Monte Carlo replication that occurs when executing WinBUGS®, the random draw for $y_A$ is the same one used for $N_B(2)$ and $M_c(1)$. This ensures that appropriate correlations are maintained as implied by the subprocess coupling.

Predictive Distribution of the Response

The use of Bayesian methods provides a natural and convenient way to consider both the parameter uncertainty and random variation in any response, say y, of interest. This is done through the Bayesian development and use of the so-called predictive distribution for the response y. Suppose the sampling distribution of the response y of interest is denoted as $f(y_A|x\theta)$. For example, from Equation (1), $f(y_A|x, \theta) = N(\mu_A, \sigma_A^2)$, where $\theta$ is the vector of all 54 coefficients and where x is the corresponding vector of signal and control factor values in the response models represented by Equations (2) and (3). The predictive distribution for y is defined as $$F(y_A | x) = \int_\theta f(y|x, \theta) \pi(\theta | Y) d\theta. \quad (12)$$

Note that $f(y|x)$ accounts for the parameter uncertainty in estimating $\theta$ by simply averaging the sampling distribution $f(y|x,\theta)$ with respect to the posterior distribution $\pi(\theta|Y)$. In this way, uncertainty regarding $\theta$ is fully represented.

In the WinBUGS® code to be presented, such predictive distributions will be estimated using Monte Carlo simulation as follows. Suppose $\{\theta_i, i=1, 2, \ldots, N\}$ denotes a set of N random draws on $\theta$ from the posterior distribution $\pi(\theta|Y)$. Then the corresponding set of N random draws from the conditional sampling distribution (given each respective value $\theta_i$), which is denoted by $\{y_i \sim f(y|x,\theta_i), i=1, 2, \ldots, N\}$, represents a set of N random draws from the desired predictive distribution in Equation (12). Note that the data in Tables 4, 8 and 12 depict a portion of the 10,000 random draws from the posterior distribution of $\theta$ for subsystems A, B and C, respectively. These posterior data will be subsequently used to capture the uncertainty component of total variability in the response(s) of interest. The predictive distributions for $y_A$, $y_B$, and $y_c$ are all sampled as described above in the WinBUGS® code discussed below.

WinBUGS® Code for Propagating Uncertainty and Random Variation

Appendix 4 contains the WinBUGS® code that was used to propagate both the uncertainty and variation through the process shown in FIG. 2. A specific set of unconstrained signal and control factor values for $M_A(1)$, $X_A(1)$, $X_A(2)$, $X_A(3)$, $X_A(4)$, $M_B(1)$, $X_B(1)$, $M_c(2)$, $X_c(1)$, and $X_c(2)$ must be specified. Note that these have all been set equal to 1 in Appendix 4 (lines 8–12, 86–87 and 130–132). Optimal (robust) choices of these values are considered in Step 3.

The code in Appendix 4 is divided into three main sections, one for each subprocess, and two different cases are considered within each section. The first case considers the combined propagation of both the uncertainty in fitting each response model as well as the random variation. The second case considers only the propagation of the random variation.

Note that the Inits section of the code contains initial values; however, if these are missing (as they are in Appendix 4), then WinBUGS® automatically generates the required initial values.

Consider the first case. At lines 14–27 reference is made to the data input matrix "betaA[i, j]." This refers to the matrix of 10,000 posterior draws made on the coefficients in the mean response model (2), a portion of which is displayed in Table 3. This 10,000×27 matrix is input to the code in the Data section of the WinBUGS code (the first few lines of which are shown) and is the empirical joint posterior distribution of $\theta$ based on 10,000 random draws. In the code in Appendix 4 this matrix of 10,000 draws is randomly sampled by randomly drawing an index between 1 and 10,000 (lines 4–5). This index, labeled "ind," then determines which of the 10,000 posterior distribution rows (or draws) in Table 3 is chosen for the values of the 27 coefficients in the mean response model. The corresponding response mean in line 28 is denoted as "muA."

The same "ind" row is used for the coefficients in the response model for the log variance, in which the matrix of joint posterior draws for the coefficients in the log variance response model (3) is referred to as "gamA[i, j]" in lines 46–59. The corresponding response variance of yA is denoted as "sigmaA2" in line 60. Note that "tauA" in line 61 is simply the reciprocal of the variance "sigmaA2," a quantity that is universally known as the precision of the response yA. The use of the same "ind" row thus preserves the correlation inherent in the joint posterior distribution. The corresponding randomly drawn response that reflects both sources of variability is calculated and labeled in the code as yA in line 62. In the same way the randomly drawn responses for both yB and yC are computed in line 116 and line 168, respectively.

At line 63 the transformed response "yAscaled" is defined. This linearly transformed response value is identical to yA except that yAscaled assumes a value between −1 and 1 roughly 99% of the time. Note that, in general, the response yA does not obey this restriction. Either this or an equivalent transformation is required in this sample problem because all factors in the corresponding experimental design used to fit the models were previously assumed to lie between −1 and 1. For example, when yA later is set equal to $N_B(2)$ and $M_c(1)$ in sections 2 and 3 of the code (see line 91 and line 133), yAscaled will be used. However, in actual practice there is no need to require that the signal, control and noise factors lie in the [−1, 1] range; thus, the use of yAscaled is unnecessary in actual practice. Based on the proceeding discussion, the two constants used in calculating yAscaled become maxA=155.4 and minA=41.60, which are input to the code in the Data section. A similar transformation of yB is likewise considered (see line 127). Finally, note that this rescaling will not affect the search for an optimum robust process-level design in Step 3, below.

Now consider the second case in which only the random variation is to be propagated through the process. This case is also considered in the WinBUGS® code in Appendix 4. Again consider subprocess A. In lines 3043 reference is made to the vector "meanA[j]." This vector contains the mean of the posterior distribution of the coefficients in the mean response model in Equation (2) as shown in Table 2.

Note that these are the sample mean values of the corresponding 10,000 random draws in Table 3. By fixing the coefficients at their respective mean values in every replication when executing the code in Appendix 4, the uncertainty in estimating these coefficients is effectively ignored. The corresponding response mean of yA in line 44 is denoted as "muAfixed."

In the same way the corresponding response log variance is calculated that effectively ignores the statistical uncertainty in estimating the coefficients in Equation (3). The vector of posterior mean values for the coefficients in Equation (3) is labeled "varA[j]" in lines 65–79 in the code. The corresponding response variance of yA is denoted as "sigmaA2fixed" in line 80 and the associated precision "tauAfixed" is calculated in line 81. The corresponding randomly drawn response that reflects only the random variation in the response yA is calculated and labeled "yAfixed" in line 82.

The final process-level response of interest in FIG. 2 is the final output yC. This response considers both the statistical uncertainty in fitting the response models and the random variation inherent in the models is yC. It is calculated in line 168 of the code. The corresponding response that considers only the random variation is labeled "yCfixed" and is calculated in line 180.

Example Problem Results

Consider the results obtained by executing the code in Appendix 4 using input data obtained from the response models fitted in Step 1. In all cases, the results are based on 100,000 Monte Carlo replications (samples). Table 10 gives some summary sample moments and quantiles of the distribution of the responses yA, yAfixed, yB, yBfixed, yC, and yCfixed for the case in which all the unconstrained signal and control factors $M_A(1)$, $X_A(1)$, $X_A(2)$, $X_A(3)$, $X_A(4)$, $M_B(1)$, $X_B(1)$, $M_c(2)$, $X_c(1)$, and $X_c(2)$ have been set equal to 1. Of primary interest is the final system response yC and yCfixed.

TABLE 10

Example Problem Results When All Unconstrained Signal and Control Factors Are Set Equal To 1.0

| Response | Mean | SD | MCError | 2.5% | 5.0% | Median | 95.0% | 97.5% |
| --- | --- | --- | --- | --- | --- | --- | --- | --- |
| YA | 141.5 | 25.4 | 0.08 | 91.4 | 99.9 | 141.4 | 183.2 | 191.7 |
| YAfixed | 141.6 | 24.3 | 0.08 | 94.2 | 101.7 | 141.6 | 181.7 | 189.2 |
| YB | 11.7 | 2.7 | 0.009 | 6.4 | 7.3 | 11.8 | 16.2 | 17.1 |
| YBfixed | 11.8 | 2.6 | 0.008 | 6.6 | 7.4 | 11.8 | 16.0 | 16.9 |
| YC | 26.4 | 4.2 | 0.01 | 18.4 | 19.6 | 26.3 | 33.4 | 34.8 |
| YCfixed | 26.4 | 4.1 | 0.01 | 18.7 | 19.9 | 26.4 | 33.2 | 34.6 |

The distributions of the responses for the case in which uncertainty in fitting the models is ignored (yAfixed, yBfixed and yCfixed) are all less diffuse than the corresponding response distributions in which this uncertainty has been considered (yA, yB and yC). However, the corresponding means are virtually the same. The differences between the distributions are quite small because of the large quantity of experimental data used to fit the response models in all three subprocesses. If significantly fewer replications had been made in each physical experimental design, then there would be more uncertainty in fitting the response models. In this case, differences between the corresponding response distributions in Table 6 would be much larger; in particular, the distribution of yC would be much more diffuse than the distribution of yCfixed.

Table 11 gives the results for the case in which all the unconstrained signal and control factors have been set equal to 0.

TABLE 11

Example Problem Results When All Unconstrained Signal and Control Factors Are Set Equal To 0

| Response | Mean | SD | MCError | 2.5% | 5.0% | Median | 95.0% | 97.5% |
| --- | --- | --- | --- | --- | --- | --- | --- | --- |
| Ya | 83.3 | 13.6 | 0.04 | 56.9 | 61.3 | 83.3 | 105.6 | 110.1 |
| Yafixed | 83.4 | 13.0 | 0.04 | 58.0 | 62.0 | 83.4 | 104.8 | 108.9 |
| YB | 0.9 | 1.1 | 0.003 | −1.2 | −0.8 | 0.9 | 2.7 | 3.1 |
| Ybfixed | 0.9 | 1.1 | 0.003 | −1.1 | −0.8 | 0.9 | 2.7 | 3.0 |
| YC | 9.5 | 1.1 | 0.004 | 7.3 | 7.6 | 9.5 | 11.3 | 11.7 |
| Ycfixed | 9.5 | 1.1 | 0.004 | 7.3 | 7.7 | 9.5 | 11.3 | 11.6 |

Note the significant differences in the corresponding response distributions between this case and that in Table 10. These differences clearly indicate the significant effect that the signal and control factor settings have on the responses. The differences between the respective response distributions when uncertainty is and is not propagated are even less apparent than they were in Table 10. The reason for this is that many terms in the response models underlying Table 11 essentially disappear because the unconstrained signal and control factors have all been set equal to 0. Thus, the corresponding models in the two cases have significantly fewer "effective" terms and the uncertainty in fitting them has less effect on the variation propagation than for the preceding case in Table 10.

Finally, Table 12 gives the results for the case in which all the unconstrained signal and control factors have been set equal to −0.5.

TABLE 12

Example Problem Results When All Unconstrained Signal and Control Factors Are Set Equal To −0.5

| Response | Mean | SD | MCError | 2.5% | 5.0% | Median | 95.0% | 97.5% |
|---|---|---|---|---|---|---|---|---|
| YA | 74.4 | 12.8 | 0.04 | 49.4 | 53.6 | 74.4 | 95.5 | 99.7 |
| Yafixed | 74.5 | 12.5 | 0.04 | 50.1 | 53.9 | 74.5 | 95.2 | 99.1 |
| YB | −0.9 | 0.9 | 0.003 | −2.6 | −2.4 | −0.9 | 0.6 | 0.9 |
| Ybfixed | −0.9 | 0.9 | 0.003 | −2.6 | −2.3 | −0.9 | 0.5 | 0.8 |
| YC | 6.8 | 0.9 | 0.003 | 5.0 | 5.3 | 6.8 | 8.3 | 8.6 |
| Ycfixed | 6.8 | 0.9 | 0.003 | 5.1 | 5.4 | 6.8 | 8.3 | 8.5 |

Basically, the same conclusions are true for Table 12 that were true for Tables 14 and 15.

Step 3—Optimizing Signal and Control Factor Values

Consider now the problem of finding values (or settings) of the ten unconstrained signal and control factors
$X_A(1)$, $X_A(2)$, $X_A(3)$, $X_A(4)$, $M_A(1)$, $X_B(1)$, $M_B(1)$, $X_c(1)$, $X_c(2)$ and $M_c(2)$
that optimize a desired (user-specified) criterion regarding process robustness. This constitutes Step 3 of the procedure.

Three different criteria will be considered that are all functions of the system output predictive distribution (i.e., the distribution of $y_c$ in the example considered herein). The first criterion is for the on-target problem in which the minimization of the mean-squared error (MSE) about some pre-specified target level is desired. The second criterion is for the smaller-the-better problem in which the minimization of an upper quantile, say the 0.90 quantile, is desired; that is, most of the predictive distribution is required to be below this value. Finally, the last criterion is for the larger-the-better problem in which the maximization of a lower quantile, say the 0.10 quantile, is desired; that is, most of the predictive distribution is required to be above this value.

Criteria may be specified other than these exemplary criteria. The same approach may be used, e.g., to optimize for an output range or dynamic response, an operating window, a dynamic operating window, classified attributes, tolerance ranges, or other specified operating criterion.

A genetic algorithm (GA) may be used to find the control and signal factor settings that optimize the various criteria. See Goldberg (1989) and Michalewicz (1992) for more information about GA's. Other techniques, such as simulated annealing, could also be considered. A computer program that implements a suitable GA (coded in the C programming language) is "SPEAR" (Simulation Process Environment for Analyzing Robustness) available from Los Alamos National Laboratory.

The basic SPEAR process is as follows:
1. Read input data.
2. Build system structure, i.e., link outputs of upstream subsystems to inputs of downstream subsystems.
3. For the evaluation option, evaluate the chosen criterion for one or more sets of inputted factor settings.
4. For the GA option, perform optimization using a GA to find optimal factor settings for a specified criterion.

The evaluation option is completed by the following process:

1. For the first subsystem, draw from response model parameter posterior, build location (mean) and dispersion (variance) predictions, and finally draw as the subsystem output a normal with that mean and variance.
2. Center and scale the subsystem output and pass to upstream subsystems inputs as defined by the links in step 2 of the basic process.
3. For noise factors that are not upstream outputs, draw from a specified normal to obtain the noise factor levels.
4. Perform steps 1–3 for the remaining subsystems; the output of the last subsystem is the system output.
5. Perform steps 1–4 over the selected number of simulations and evaluate one of three criteria: MSE for the on-target problem, small quantile (e.g., 0.10) for the larger-the better problem and the large quantile (e.g., 0.90) for the smaller-the-better problem based on the simulation output values.

The GA option is completed by the following process:
1. Generate initial population of population size (popSize) factor settings randomly within specified ranges and evaluate criterion. Sort factor settings in increasing order by the criterion to form a current population.
2. Create popSize new factor settings by group crossover: choose parents from current population with probability inversely proportional to rank established in step 1 and for each of factors, i.e., all the factors for a given subsystem, randomly choose from one of the chosen parents.
3. Create popSize new factor settings by individual crossover; choose parents from current population with probability inversely proportional to rank established in step 1 and for each factor of the system randomly choose from one of the chosen parents.
4. Create popSize new factor settings by mutation; for each factor setting in the current population, randomly mutate each with probability decreasing in successive generations was well as magnitude of mutation decreasing in successive generations. Employ punctuated equilibrium that periodically resets the probability and magnitude of mutation to their original values.
5. Evaluate the 3xpopSize new factor settings from steps 24 and with the current population (popSize factor settings) sort in increasing order by the criterion. The top popSize factor settings with the smallest criterion become the current population.
6. Repeat steps 2–5 for a specified number of generations.

As mentioned above there are ten signal and control factors whose optimal settings are desired. Consistent with the range of factors considered in the example, the search space for each of the factors was restricted to the interval [−1,1]. First consider the on-target problem with a specified target of 10. After 250 genetic generations, SPEAR found the near-optimal solution $$\{X_A(1)=0.063228, X_A(2)=0.907804, X_A(3)=0.761639, X_A(4)=0.908774,$$

$$M_A(1)=0.063228, X_B(1)=0.907804, X_C(1)=0.341987,$$

$$X_C(2)=0.995033, M_C(2)=0.761639\} \quad (13)$$

whose MSE is 0.44.

Next consider the smaller-the-better problem that minimizes the 0.90 quantile of the system predictive distribution. After 100 generations, SPEAR identified the near-optimal solution $$\{X_A(1)=0.543923, X_A(2)=0.981666, X_A(3)=0.991913, X_A(4)=0.799544,$$

$$M_A(1)=0.913772, X_B(1)=0.996249, M_B(1)=0.998481, X_C(1)=-0.998864,$$

$$X_C(2)=-0.998510, M_C(2)=-0.988928, \quad (14)$$

whose 0.90 quantile is 1.15. The values close to either −1 or 1 in Equation (14) is suggest that an improved near-optimal solution might be to set these values to −1 or 1, respectively. This observation suggests the new solution set given by $$\{X_A(1)=0.543923, X_A(2)=1, X_A(4)=0.799544,$$

$$M_A(1)=0.913772, X_B(1)=1, X_C(1)=1,$$

$$X_C(2)=-1, M_C(2)=-1\}. \quad (15)$$

Executing SPEAR with this set of values produces a 0.90 quantile of 1.11, which is slightly smaller than that in (14). This shows how GAs can be used to "suggest" additional improvement in the desired near-optimal robust process solution.

Finally, consider the larger-the-better problem in which the 0.10 quantile of the system predictive distribution is maximized. After 100 generations, SPEAR found the near-optimal solution $$\{X_A(1)=0.730439, X_A(2)=0.997728, X_A(3)=-0.995790, X_A(4)=0.989948,$$

$$M_A(1)=0.984033, X_B(1)=0.994149, M_B(1)=0.992398, X_C(1)=0.998569,$$

$$X_C(2)=0.982360, M_C(2)=0.998157\}, \quad (16)$$

whose 0.10 quantile is 22.66. As in the above smaller-the-better case, the "GA-suggested" solution $$X_A(1)=0.730439, X_A(2)=1, X_A(3)=-1, X_A(4)=1,$$

$$M_A(1)=1, X_B(1)=1, M_B(1)=1, X_C(1)=1,$$

$$X_C(2)=1, M_C(2)=1\} \quad (17)$$

represents a slight improvement with a 0.10 quantile of 22.92.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

APPENDIX 1

WinBUGS ® Code Used for Fitting the Subprocess A Experimental Data

Model
```
{
    for(i in 1:N){
        y[i]~dnorm(mu[i],tau[i])
        mu[i]<-sum(v[i,])
        for(j in 1:P){
            v[i,j]<-beta[j]*x[i, j]
        }
        tau[i]<-1/exp(sum(w[i,]))
        for(j in 1:P){
            w[i,j]<-gam[j]*x[i, j]
        }
    }
    #priors
    for(j in 1:P){
        beta[j]~dnorm(0,.0001)
        gam[j]~dnorm(0,.0001)
    }
}
```
Data  list(N=648,P=27,
y=c(81.6, 112.6, 120, 84.2, 92.4, 162.4, 76.3, 123.4, 173.3, 84.6, 96.9, 105.4,
64.4, 84.7, 131.3, 89.5, 134.3, 182.9, 79.5, 91.8, 143.7, 80.9, 113.7, 162.4,
85.4, 104.5, 143.6, . . . ),
x=structure(.Data = c(
1, −1, 1, −1, 1, −1, 1, 1, −1, 1, 1, −1, −1, 1, 1, −1, −1, 1, 1, −1, −1, 1, −1, 1, −1, 1,
1, −1, 1, −1, 1, −1, 1, 1, 0, 0, 0, 0, 0, 0, 0, 0, 0, 0, 0, 0, 0, 0, 0, 0, 0,
1, −1, 1, −1, 1, −1, 1, 1, 1, 1, 1, −1, −1, 1, 1, −1, −1, 1, 1, −1, −1, 1, 1, 1, 1, 1,
1, 0, 0, 0, 0, 0, 0, 1, 1, −1, 1, 0, 0, 0, 0, 0, 0, 0, 0, 0, 0, 0, −1, 1, −1, 1,
1, 0, 0, 0, 0, 0, 0, 1, 1, 0, 0, 0, 0, 0, 0, 0, 0, 0, 0, 0, 0, 0, 0, 0, 0, 0,
1, 0, 0, 0, 0, 0, 0, 1, 1, 1, 1, 0, 0, 0, 0, 0, 0, 0, 0, 0, 0, 0, 1, 1, 1, 1,

APPENDIX 1-continued

WinBUGS ® Code Used for Fitting the Subprocess A Experimental Data

```
        1, 1, 1, 1, 1, 1, 1, 1, 1, -1, 1, -1, 1, -1, 1, -1, 1, -1, 1, -1, 1, -1, 1, -1, 1, -1, 1,
        1, 1, 1, 1, 1, 1, 1, 1, 1, 0, 0, 0, 0, 0, 0, 0, 0, 0, 0, 0, 0, 0, 0, 0, 0, 0, 0,
        1, 1, 1, 1, 1, 1, 1, 1, 1, 1, 1, 1, 1, 1, 1, 1, 1, 1, 1, 1, 1, 1, 1, 1, 1, 1, 1,
        1, -1, 1, 0, 0, 1, 1, 0, 0, -1, 1, 1, -1, -1, 1, 0, 0, 0, 0, -1, 1, -1, 1, 0, 0, 0, 0,
        1, -1, 1, 0, 0, 1, 1, 0, 0, 0, 0, 0, 0, 0, 0, 0, 0, 0, 0, 0, 0, 0, 0, 0, 0, 0, 0,
        1, -1, 1, 0, 0, 1, 1, 0, 0, 1, 1, -1, -1, 1, 1, 0, 0, 0, 0, 1, 1, 1, 1, 0, 0, 0, 0,
        1, 0, 0, 1, 1, -1, 1, 0, 0, -1, 1, 0, 0, 0, 0, -1, 1, -1, 1, 1, -1, -1, 1, 0, 0, 0, 0,
        1, 0, 0, 1, 1, -1, 1, 0, 0, 0, 0, 0, 0, 0, 0, 0, 0, 0, 0, 0, 0, 0, 0, 0, 0, 0, 0,
        1, 0, 0, 1, 1, -1, 1, 0, 0, 1, 1, 0, 0, 0, 0, 1, 1, 1, 1, -1, -1, 1, 1, 0, 0, 0, 0,
        1, 1, 1, -1, 1, 0, 0, 0, 0, -1, 1, -1, 1, -1, 1, 1, -1, -1, 1, 0, 0, 0, 0, 0, 0, 0, 0,
        1, 1, 1, -1, 1, 0, 0, 0, 0, 0, 0, 0, 0, 0, 0, 0, 0, 0, 0, 0, 0, 0, 0, 0, 0, 0, 0,
        1, 1, 1, -1, 1, 0, 0, 0, 0, 1, 1, 1, 1, 1, 1, -1, -1, 1, 1, 0, 0, 0, 0, 0, 0, 0, 0,
        1, -1, 1, 1, 1, 0, 0, -1, 1, -1, 1, 1, -1, -1, 1, -1, 1, -1, 1, 0, 0, 0, 0, 1, -1, -1, 1,
        1, -1, 1, 1, 1, 0, 0, -1, 1, 0, 0, 0, 0, 0, 0, 0, 0, 0, 0, 0, 0, 0, 0, 0, 0, 0, 0,
        1, -1, 1, 1, 1, 0, 0, -1, 1, 1, 1, -1, -1, 1, 1, 1, 1, 1, 1, 0, 0, 0, 0, -1, 1, 1, 1,
        1, 0, 0, -1, 1, 1, 1, -1, 1, -1, 1, 0, 0, 0, 0, 1, -1, -1, 1, -1, 1, -1, 1, 1, -1, -1, 1,
        1, 0, 0, -1, 1, 1, 1, -1, 1, 0, 0, 0, 0, 0, 0, 0, 0, 0, 0, 0, 0, 0, 0, 0, 0, 0, 0,
        1, 0, 0, -1, 1, 1, 1, -1, 1, 1, 0, 0, 0, 0, -1, -1, 1, 1, 1, 1, 1, 1, 1, -1, -1, 1, 1,
        1, 1, 1, 0, 0, -1, 1, -1, 1, -1, 1, 1, -1, 1, -1, 1, 0, 0, 0, 0, 1, -1, -1, 1, 1, -1, 1,
        1, 1, 1, 0, 0, -1, 1, -1, 1, 0, 0, 0, 0, 0, 0, 0, 0, 0, 0, 0, 0, 0, 0, 0, 0, 0, 0,
        1, 1, 1, 0, 0, -1, 1, -1, 1, 1, 1, 1, 1, 1, 1, 0, 0, 0, 0, -1, -1, 1, 1, 1, -1, -1, 1, 1,
        ), .Dim = c(648,27))
        )
Inits   list(
        beta=c(0, 0, 0, 0, 0, 0, 0, 0, 0, 0, 0, 0, 0, 0, 0, 0, 0, 0, 0, 0, 0, 0, 0, 0, 0, 0, 0),
        gam= c(0, 0, 0, 0, 0, 0, 0, 0, 0, 0, 0, 0, 0, 0, 0, 0, 0, 0, 0, 0, 0, 0, 0, 0, 0, 0, 0)
        )
```

APPENDIX 2

WinBUGS ® Code Used for Fitting the Subprocess B Experimental Data

```
Model
        {
        for(i in 1:N){
                y[i]~dnorm(mu[i],tau[i])
                mu[i]<-sum(v[i,])
                for(j in 1:P){
                        v[i, j]<-beta[j]*x[i, j]
                }
                tau[i]<-1/exp(sum(w[i,]))
                for(j in 1:P){
                        w[i,j]<-gam[j]*x[i, j]
                }
        }
        #priors
        for(j in 1:P){
                beta[j]~dnorm(0,.0001)
                gam[j]~dnorm(0,.0001)
                }
        }
Data    list(N=360,P=13,
        y=c(1.0222313772613, 3.30380246194645, 2.96783207048044,
        -1.71103137676792, 1.01778768546934, 4.99248831839138,
        -3.52370264047394, -1.88850624151059, 2.34965824845535,
        -3.35469023092926, -2.72229802666213, 0.929698360821718,
        -2.65104459346426, 0.59033547333987, 5.28626071838787,
        0.80470511161986, 4.95036383132113, 12.0015966114864,
        -2.74106625720672, 1.24323218522834, 4.00819705594657,
        2.78380916054087, 2.28396152726971, 7.60048217796392,
        -2.03111239421246, 4.67051824088452, 9.68491548110108,
        -6.11601080159518, -1.15532428484602, 2.86741940060693,
        -3.4844926448951, 2.60820652412553, 9.79463763869866,
        2.06027307337399, 8.51261838342163, 18.3251973109351, . . .),
        x=structure(.Data = c(
        1, -1, 1, -1, 1, 1, -1, -1, 1, 1, 1, 1, 1,
        1, -1, 1, 0, 0, 0, -1, -1, 1, 1, 1, 0, 0,
        1, -1, 1, 1, 1, -1, -1, -1, 1, 1, 1, 1, -1, -1,
        1, 0, 0, -1, 1, 0, -1, -1, 1, 0, 0, 1, 1,
        1, 0, 0, 0, 0, 0, -1, -1, 1, 0, 0, 0, 0,
        1, 0, 0, 1, 1, 0, -1, -1, 1, 0, 0, -1, -1, 1,
        1, 1, -1, 1, -1, -1, -1, 1, -1, -1, 1, 1,
        1, 1, 1, 0, 0, 0, 0, -1, -1, 1, 1, -1, 0, 0,
```

APPENDIX 2-continued

WinBUGS ® Code Used for Fitting the Subprocess B Experimental Data

```
        1, 1, 1, 1, 1, 1, -1, -1, 1, -1, -1, -1, -1,
        1, -1, 1, -1, 1, 1, -1, 1, -1, 1, -1, 1, -1,
        1, -1, 1, 0, 0, 0, -1, 1, -1, 1, -1, 0, 0,
        1, -1, 1, 1, 1, -1, -1, 1, -1, 1, -1, -1, 1,
        1, 0, 0, -1, 1, 0, -1, 1, -1, 0, 0, 1, -1,
        1, 0, 0, 0, 0, 0, -1, 1, -1, 0, 0, 0, 0,
        1, 0, 0, 1, 1, 0, -1, 1, -1, 0, 0, -1, 1,
        1, 1, 1, -1, 1, -1, -1, 1, -1, -1, 1, 1, -1,
        1, 1, 1, 0, 0, 0, -1, 1, -1, -1, 1, 0, 0,
        1, 1, 1, 1, 1, 1, -1, 1, -1, -1, 1, -1, 1,
        1, -1, 1, -1, 1, 1, -1, -1, -1, 1, 1, -1, 1,
        1, -1, 1, 0, 0, 0, 1, -1, -1, -1, 1, 0, 0,
        1, -1, 1, 1, 1, -1, 1, -1, -1, -1, 1, 1, -1,
        1, 0, 0, -1, 1, 0, 1, -1, -1, 0, 0, -1, 1,
        1, 0, 0, 0, 0, 0, 1, -1, -1, 0, 0, 0, 0,
        1, 0, 0, 1, 1, 0, 1, -1, -1, 0, 0, 1, -1,
        1, 1, 1, -1, 1, -1, 1, -1, -1, 1, -1, -1, 1,
        1, 1, 1, 0, 0, 0, 1, -1, -1, 1, -1, 0, 0,
        1, 1, 1, 1, 1, 1, 1, -1, -1, 1, -1, 1, -1,
        1, -1, 1, -1, 1, 1, 1, 1, -1, -1, -1, -1, -1,
        1, -1, 1, 0, 0, 0, 1, 1, -1, -1, 0, 0,
        1, -1, 1, 1, 1, -1, 1, 1, -1, -1, 1, 1,
        1, 0, 0, -1, 1, 0, 1, 1, 0, 0, -1, -1,
        1, 0, 0, 0, 0, 0, 1, 1, 0, 0, 0, 0,
        1, 0, 0, 1, 1, 0, 1, 1, 1, 0, 0, 1, 1,
        1, 1, 1, -1, 1, -1, 1, 1, 1, 1, 1, -1, -1,
        1, 1, 1, 0, 0, 0, 1, 1, 1, 1, 0, 0,
        1, 1, 1, 1, 1, 1, 1, 1, 1, 1, 1, 1, 1,
        1, -1, 1, -1, 1, 1, -1, -1, 1, 1, 1, 1, 1,
        . . . ), .Dim = c(360, 13))
        )
Inits   list(
        beta=c(0, 0, 0, 0, 0, 0, 0, 0, 0, 0, 0, 0, 0),
        gam=c(0, 0, 0, 0, 0, 0, 0, 0, 0, 0, 0, 0, 0)
        )
```

APPENDIX 3

WinBUGS ® Code Used for Fitting the Subprocess C Experimental Data

Model
```
{
    for(i in 1:N){
        y[i]~dnorm(mu[i],tau[i])
        mu[i]<-sum(v[i,])
        for(j in 1:P){
            v[i, j]<-beta[j]*x[i, j]
        }
        tau[i]<-1/exp(sum(w[i,]))
        for(j in 1:P){
            w[i, j]<-gam[j]*x[i, j]
        }
    }
    #priors
    for(j in 1:P){
        beta[j]~dnorm(0,.0001)
        gam[j]~dnorm(0,.0001)
    }
}
```

Data
```
list(list(N=640, P=16,
y=c(5.67095855324569, 7.7769210501485, 8.08412993809917,
6.50753842448772, 7.19725992711721, 13.5090289210333, 10.6134513373582,
13.5178808951286, -2.17806158641439, 7.3277615903639, 4.83904839995033,
15.0851539314981, 2.58195320183964, 15.7155759839728, 6.97454348851466,
17.6209885789018, 3.81833768704564, 11.1183842161589, 6.4560779119369,
16.5609882853198, 5.88295579481042, 15.3090985137198, 8.09559321485322,
19.7920472264327, -0.113364355636535, 13.5484679248375,
6.23418387182808, 16.2392289937735, 1.60911917956649, 19.061415146933,
8.79527922569713, 25.9413224146589, . . .),
x=structure(.Data = c(
1, -1, -1, 1, -1, -1, 1, 1, 1, 1, -1, 1, 1, 1,
1, 1, -1, -1, -1, -1, 1, -1, 1, -1, 1, -1, -1, 1, 1,
1, -1, 1, -1, -1, -1, 1, 1, -1, 1, -1, -1, 1, -1, 1, 1,
1, 1, 1, 1, -1, -1, 1, -1, -1, -1, -1, -1, -1, -1, 1, 1,
1, -1, -1, 1, 1, -1, -1, -1, -1, 1, 1, -1, 1, 1, -1, 1,
1, 1, -1, -1, 1, -1, -1, 1, -1, -1, 1, -1, -1, 1, -1, 1,
1, -1, 1, -1, 1, -1, -1, 1, 1, 1, -1, -1, 1, -1, -1, 1,
1, 1, 1, 1, 1, -1, -1, 1, 1, -1, -1, -1, -1, -1, -1, 1,
1, -1, -1, 1, -1, 1, 1, 1, 1, 1, 1, 1, -1, -1, -1, -1,
1, 1, -1, -1, -1, -1, 1, -1, 1, -1, 1, 1, 1, -1, -1, -1,
1, -1, 1, -1, -1, -1, 1, 1, -1, 1, -1, 1, 1, -1, -1, -1,
1, 1, 1, 1, -1, -1, 1, -1, -1, -1, -1, 1, 1, 1, -1, -1,
1, -1, -1, 1, 1, -1, -1, -1, -1, 1, 1, 1, -1, -1, 1, -1,
1, 1, -1, 1, 1, -1, 1, -1, -1, 1, 1, 1, 1, -1, 1, -1,
1, -1, 1, -1, 1, -1, -1, 1, 1, -1, 1, -1, 1, 1, 1, -1,
1, 1, 1, 1, -1, -1, 1, 1, -1, -1, 1, 1, 1, 1, -1,
1, -1, -1, 1, -1, 1, -1, 1, 1, -1, -1, 1, 1, 1, -1,
1, 1, -1, -1, 1, -1, -1, 1, 1, -1, -1, -1, -1, 1, 1, -1,
1, -1, 1, -1, -1, 1, -1, 1, -1, -1, 1, -1, 1, -1, 1, -1,
1, 1, 1, -1, 1, -1, -1, -1, 1, 1, -1, -1, -1, 1, -1,
1, -1, -1, 1, 1, 1, -1, -1, -1, -1, -1, 1, 1, -1, -1,
1, 1, -1, 1, 1, 1, 1, -1, 1, -1, -1, -1, 1, -1, -1,
1, -1, 1, -1, 1, 1, 1, -1, 1, -1, 1, -1, 1, -1, -1, -1,
1, 1, 1, 1, 1, 1, 1, 1, 1, -1, -1, -1, -1, -1,
1, -1, -1, 1, -1, 1, -1, 1, 1, -1, -1, 1, -1, -1, -1, 1,
1, 1, -1, -1, 1, -1, -1, 1, 1, 1, -1, 1, 1, -1, -1, 1,
1, -1, 1, -1, -1, 1, -1, 1, -1, 1, 1, -1, 1, -1, 1,
1, 1, 1, -1, 1, -1, -1, -1, 1, 1, 1, 1, 1, -1, 1,
1, -1, -1, 1, 1, 1, -1, -1, -1, -1, 1, -1, -1, 1, 1,
1, 1, -1, 1, 1, 1, 1, -1, 1, -1, 1, 1, -1, 1, 1,
1, -1, 1, -1, 1, 1, 1, -1, 1, -1, 1, 1, -1, 1, 1, 1,
1, 1, 1, 1, 1, 1, 1, 1, 1, 1, 1, 1, 1, 1, 1,
 . . . ), .Dim = c(640, 16))
)
```

Inits
```
list(
beta=c(0, 0, 0, 0, 0, 0, 0, 0, 0, 0, 0, 0, 0, 0, 0, 0),
gam=c(0, 0, 0, 0, 0, 0, 0, 0, 0, 0, 0, 0, 0, 0, 0, 0)
)
```

APPENDIX 4

WinBUGS ® Uncertainty and Variation Propagation Code

```
1   Model
2   {
3           #Random sampling a data vector
4                   uran ~ dunif(0,1)
5                   ind <- trunc(N*uran)+1
6           #Subprocess A
7                   #Subprocess A Input
8                           XA1 <- 1
9                           XA2 <- 1
10                          XA3 <- 1
11                          XA4 <- 1
12                          MA1 <- 1
13                  #Mean
14                          muA1 <- betaA[ind,1]+betaA[ind,2]*XA1+betaA[ind,4]*XA2
15                              +betaA[ind,6]*XA3+betaA[ind,8]*XA4+betaA[ind,3]*XA1*XA1
16                              +betaA[ind,5]*XA2*XA2+betaA[ind,7]*XA3*XA3
17                              +betaA[ind,9]*XA4*XA4+betaA[ind,10]*MA1
18                              +betaA[ind,11]*MA1*MA1+betaA[ind,12]*XA1*MA
19                              +betaA[ind,16]*XA2*MA1+betaA[ind,20]*XA3*MA1
20                              +betaA[ind,24]*XA4*MA1+betaA[ind,14]*XA1*XA3*MA1
21                              +betaA[ind,18]*XA2*XA2*MA1+betaA[ind,22]*XA3*XA3*MA1
22                          muA2 <- betaA[ind,26]*XA4*XA4*MA1+betaA[ind,13]*XA1*MA1*MA1
23                              +betaA[ind,17]*XA2*MA1*MA1+betaA[ind,21]*XA3*MA1*MA1
24                              +betaA[ind,25]*XA4*MA1*MA1+betaA[ind,15]*XA1*XA1*MA1*MA1
25                              +betaA[ind,19]*XA2*XA2*MA1*MA1
26                              +betaA[ind,23]*XA3*XA3*MA1*MA1
27                              +betaA[ind,27]*XA4*XA4*MA1*MA1
28                          muA <- muA1+muA2
29                  #Fixed Mean
30                          muA1fixed <- meanA[1]+meanA[2]*XA1+meanA[4]*XA2
31                              +meanA[6]*XA3+meanA[8]*XA4+meanA[3]*XA1*XA1
32                              +meanA[5]*XA2*XA2+meanA[7]*XA3*XA3
33                              +meanA[9]*XA4*XA4+meanA[10]*MA1
34                              +meanA[11]*MA1*MA1+meanA[12]*XA1*MA1
35                              +meanA[16]*XA2*MA1+meanA[20]*XA3*MA1
36                              +meanA[24]*XA4*MA1+meanA[14]*XA1*XA1*MA1
37                      +meanA[18]*XA2*XA2*MA1+meanA[22]*XA3*XA3*MA1
38                          muA2fixed <- meanA[26]*XA4*XA4*MA1+meanA[13]*XA1*MA1*MA1
39                              +meanA[17]*XA2*MA1*MA1+meanA[21]*XA3*MA1*MA1
40                              +meanA[25]*XA4*MA1*MA1+meanA[15]*XA1*XA1*MA1*MA1
41                              +meanA[19]*XA2*XA2*MA1*MA1
42                              +meanA[23]*XA3*XA3*MA1*MA1
43                              +meanA[27]*XA4*XA4*MA1*MA1
44                          MuAfixed <- muA1fixed+muA2fixed
45                  #Variance
46                          SigmaA21 <- gamA[ind,1]+gamA[ind,2]*XA1+gamA[ind,4]*XA2
47                              +gamA[ind,6]*XA3+gamA[ind,8]*XA4+gamA[ind,3]*XA1*XA1
48                              +gamA[ind,5]*XA2*XA2+gamA[ind,7]*XA3*XA3
49                              +gamA[ind,9]*XA4*XA4+gamA[ind,10]*MA1
50                              +gamA[ind,11]*MA1*MA1+gamA[ind,12]*XA1*MA1
51                              +gamA[ind,16]*XA2*MA1+gamA[ind,20]*XA3*MA1
52                      +gamA[ind,24]*XA4*MA1+gamA[ind,14]*XA1*XA1*MA1
53                              +gamA[ind,18]*XA2*XA2*MA1+gamA[ind,22]*XA3*XA3*MA1
54                          SigmaA22 <- gamA[ind,26]*XA4*XA4*MA1+gamA[ind,13]*XA1*MA1*MA1
55                              +gamA[ind,17]*XA2*MA1*MA1+gamA[ind,21]*XA3*MA1*MA1
56                              +gamA[ind,25]*XA4*MA1*MA1+gamA[ind,15]*XA1*XA1*MA1*MA1
57                              +gamA[ind,19]*XA2*XA2*MA1*MA1
58                              +gamA[ind,23]*XA3*XA3*MA1*MA1
59                              +gamA[ind,27]*XA4*XA4*MA1*MA1
60                          SigmaA2 <- exp(sigmaA21+sigmaA22)
61                          tauA <- 1/sigmaA2
62                          yA ~ dnorm(muA, tauA)
63                          YAscaled <- (2/(maxA-minA))*yA - (maxA+minA)/(maxA-minA)
64                  #Fixed Variance
65                          SigmaA21fixed <- varA[1]+varA[2]*XA1+varA[4]*XA2
66                              +varA[6]*XA3+varA[8]*XA4+varA[3]*XA1*XA1
67                              +varA[5]*XA2*XA2+varA[7]*XA3*XA3
68                              +varA[9]*XA4*XA4+varA[10]*MA1
69                              +varA[11]*MA1*MA1+varA[12]*XA1*MA1
70                              +varA[16]*XA2*MA1+varA[20]*XA3*MA1
71                              +varA[24]*XA4*MA1+varA[14]*XA1*XA1*MA1
72                              +varA[18]*XA2*XA2*MA1+varA[22]*XA3*XA3*MA1
73                          SigmaA22fixed <- varA[26]*XA4*XA4*MA1
74                              +varA[13]*XA1*MA1*MA1
75                              +varA[17]*XA2*MA1*MA1+varA[21]*XA3*MA1*MA1
76                              +varA[25]*XA4*MA1*MA1+varA[15]*XA1*XA1*MA1*MA1
77                              +varA[19]*XA2*XA2*MA1*MA1
```

APPENDIX 4-continued

WinBUGS ® Uncertainty and Variation Propagation Code

```
78                  +varA[23]*XA3*XA3*MA1*MA1
79                  +varA[27]*XA4*XA4*MA1*MA1
80              SigmaA2fixed <- exp(sigmaA21fixed+sigmaA22fixed)
81              TauAfixed <- 1/sigmaA2fixed
82              YAfixed ~ dnorm(muAfixed,tauAfixed)
83              YAscaledfixed <- (2/(maxA-minA))*yAfixed - (maxA+minA)/(maxA-minA)
84     #Subprocess B
85              #SubprocessB Input
86          XB1 <- 1
87          MB1 <- 1
88              NB1sigma2<- 1/9
89          NB1tau <- 1/NB1sigma2
90          NB1 ~ dnorm(0, NB1tau)
91          NB2 <- yAscaled
92          #Mean
93              muB <- betaB[ind,1]+betaB[ind,2]*XB1+betaB[ind,3]*XB1*XB1
94                  +betaB[ind,4]*MB1
95                  +betaB[ind,5]*MB1*MB1+betaB[ind,6]*XB1*MB1
96                  +betaB[ind,7]*NB1+betaB[ind,8]*NB2+betaB[ind,9]*NB1*NB2
97                  +betaB[ind,10]*XB1*NB1+betaB[ind,11]*XB1*NB2
98                  +betaB[ind,12]*MB1*NB1+betaB[ind,13]*MB1*NB2
99          #Fixed Mean
100             MuBfixed <- meanB[1]+meanB[2]*XB1+meanB[3]*XB1*XB1
101                 +meanB[4]*MB1
102                 +meanB[5]*MB1*MB1+meanB[6]*XB1*MB1
103                 +meanB[7]*NB1+meanB[8]*yAscaledfixed
104                 +meanB[9]*NB1*yAscaledfixed
105                 +meanB[10]*XB1*NB1+meanB[11]*XB1*yAscaledfixed
106                 +meanB[12]*MB1*NB1+meanB[13]*MB1*yAscaledfixed
107         #Variance
108             SigmaB2 <- exp(gamB[ind,1]+gamB[ind,2]*XB1+gamB[ind,3]*XB1*XB1
109                 +gamB[ind,4]*MB1
110                 +gamB[ind,5]*MB1*MB1+gamB[ind,6]*XB1*MB1
111                 +gamB[ind,7]*NB1+gamB[ind,8]*NB2
112                 +gamB[ind,9]*NB1*NB2
113                 +gamB[ind,10]*XB1*NB1+gamB[ind,11]*XB1*NB2
114                 +gamB[ind,12]*MB1*NB1+gamB[ind,13]*MB1*NB2)
115             tauB <- 1/sigmaB2
116             yB ~ dnorm(muB,tauB)
117             YBscaled <- (2/(maxB-minB))*yB - (maxB+minB)/(maxB-minB)
118         #Fixed Variance
119             SigmaB2fixed <- exp(varB[1]+varB[2]*XB1+varB[3]*XB1*XB1
120                 +varB[4]*MB1
121                 +varB[5]*MB1*MB1+varB[6]*XB1*MB1
122                 +varB[7]*NB1+varB[8]*yAscaledfixed+varB[9]*NB1*yAscaledfixed
123                 +varB[10]*XB1*NB1+varB[11]*XB1*yAscaledfixed
124                 +varB[12]*MB1*NB1+varB[13]*MB1*yAscaledfixed)
125             TauBfixed <- 1/sigmaB2fixed
126             YBfixed ~ dnorm(muBfixed,tauBfixed)
127             YBscaledfixed <- (2/(maxB-minB))*yBfixed - (maxB+minB)/(maxB-minB)
128    #Subprocess C
129             #Subprocess C Input
130         XC1 <- 1
131         XC2 <- 1
132         MC2 <- 1
133             MC1 <- yAscaled
134             NC1 <- yBscaled
135         #Mean
136             muC <- betaC[ind,1]+betaC[ind,2]*XC1 +betaC[ind,3]*XC2
137                 +betaC[ind,4]*XC1*XC2
138                 +betaC[ind,5]*MC1+betaC[ind,6]*MC2
139                 +betaC[ind,7]*MC1*MC2+betaC[ind,8]*XC1*MC1
140                 +bcarC[ind,9]*XC2*MC1
141                 +betaC[ind,10]*XC1*MC2+betaC[ind,11]*XC2*MC2
142                 +betaC[ind,12]*NC1+betaC[ind,13]*XC1*NC1
143                 +betaC[ind,14]*XC2*NC1+betaC[ind,15]*MC1*NC1
144                 +betaC[ind,16]*MC2*NC1
145         #Fixed Mean
146             MuCfixed <- meanC[1]+meanC[2]*XC1+meanC[3]*XC2
147                 +meanC[4]*XC1*XC2
148                 +meanC[5]*yAScaledfixed+meanC[6]*MC2
149                 +meanC[7]*yAscaledfixed*MC2+meanC[8]*XC1*yAscaledfixed
150                 +meanC[9]*XC2*yAscaledfixed
151                 +meanC[10]*XC1*MC2+meanC[11]*XC2*MC2
152                 +meanC[12]*yBscaledfixed
153                 +meanC[13]*XC1*yBscaledfixed
154                 +meanC[14]*XC2*yBscaledfixed
```

APPENDIX 4-continued

WinBUGS ® Uncertainty and Variation Propagation Code

```
155                     +meanC[15]*yAscaledfixed*yBscaledfixed
156                     +meanC[16]*MC2*yBscaledfixed
157             #Variance
158                 SigmaC2 <- exp(gamC[ind,1]+gamC[ind,2]*XC1+gamC[ind,3]*XC2
159                     +gamC[ind,4]*XC1*XC2
160                     +gamC[ind,5]*MC1+gamC[ind,6]*MC2
161                     +gamC[ind,7]*MC1*MC2+gamC[ind,8]*XC1*MC1
162                     +gamC[ind,9]*XC2*MC1
163                     +gamC[ind,10]*XC1*MC2+gamC[ind,11]*XC2*MC2
164                     +gamC[ind,12]*NC1+gamC[ind,13]*XC1*NC1
165                     +gamC[ind,14]*XC2*NC1+gamC[ind,5]*MC1*NC1
166                     +gamC[ind,16]*MC2*NC1)
167                 tauC <- 1/sigmaC2
168                 yC ~ dnorm(muC,tauC)
169             #Fixed Variance
170                 SigmaC2fixed <- exp(varC[1]+varC[2]*XC1+varC[3]*XC2
171                     +varC[4]*XC1*XC2
172                     +varC[5]*yAscaledfixed+varC[6]*MC2
173                     +varC[7]*yAscaledfixed*MC2+varC[8]*XC1*yAscaledfixed
174                     +varC[9]*XC2*yAscaledfixed
175                     +varC[10]*XC1*MC2+varC[11]*XC2*MC2
176                     +varC[12]*yBscaledfixed+varC[13]*XC1*yBscaledfixed
177                     +varC[14]*XC2*yBscaledfixed+varC[15]*yAscaledfixed*yBscaledfixed
178                     +varC[16]*MC2*yBscaledfixed)
179             TauCfixed <- 1/sigmaC2fixed
180             Ycfixed ~ dnorm(muCfixed,tauCfixed)
181         }
182
183 Data list(N = 10000,maxA = 155.4,minA=4[001b]1.60,maxB=9.56,minB-3.56,
184 BetaA=structure(.Data = c(84.79, -1.391, 5.839, -0.4638, -0.04058, 3.033, 0.6528. -0.5753,
185 9.911, 24.8, 3.39, 5.98, 7.768, -4.317, -3.237, -2.339, -1.44, 9.031, 5.786, 4.202, 1.968,
186 -3.43, -3.949, -2.079, 0.7155, 5.493, -0.7198, 84.46, -0.8472, 5.703, -0.7473, -0.2383, 4.975,
187                                .
188                                .
189                                .
190 0.05298), .Dim = c(10000,16)), meanA = c(83.33, -0.3759, 6.059, -1.659, 3.059, 3.717,
191 -1.536, -1.225, 9.741, 27.34, 3.824, 4.828, 6.069, -3.583, -1.659, -2.6, -0.7749, 6.368, 0.5075, 3.078,
192 0.8013, -5.459, -1.466, -1.364, 1.178, 3.877, -0.584), varA =
193 c(5.127, -0.1261, 0.1616, 0.004675, 0.6634, 0.128, -0.3609, -0.2438, -0.1144, 0.7284,
194 -0.08436, 0.212, 0.2282, -0.09056, -0.09814, 0.1753, -0.2015, -0.09232,
195 -0.3152, -0.07639, -0.0995, -0.07744, 0.3234, 0.1375, 0.247, 0.1593, 0.06888), meanB =
196 c(1.078, 1.935, 0.8815, 3.91, 0.453, 0.9896, 0.5004, 0.4852, 0.01221, 1.069, 2.013, 0.7286, 0.8116),
197 varB = c(0.09553, 0.3694, 0.0583, 0.6427, -0.09586, 0.323, 0.02492, 0.06195, -0.1486,
198 -0.1217, -0.126, -0.1428, 0.1516), meanC = c(9.961, 4.901, 1.977, -0.1252, 1.989, 1.016,
199 -0.02026, 0.9881, 0.04363, 1.013, 0.05546, -0.02075, 1.955, 0.9389, 0.5237, 0.7039), varC =
200 c(0.04872, 0.5136, 0.9208, 0.4388, -0.07747, -0.008868, 0.09123, 0.04437, -0.07683,
201 -0.02502, 0.07783, 0.05466, 0.1063, 0.01259, -0.01071, -0.009254))
202
203 Inits list( )
```

What is claimed is:

1. A computer-implemented method for determining the variability of a manufacturing system having a plurality of subsystems, comprising:

characterizing each subsystem of the plurality of subsystems by signal factors, noise factors, control factors, and an output response, all having mean and variance values;

fitting response models to each subsystem to determine unknown coefficients for use in the response models that characterize a relationship between the signal factors, noise factors, control factors, and the corresponding output response having a mean and variance that is related to the signal factors, noise factors, and control factors;

coupling the response models for each subsystem to model an output of the manufacturing system as a whole;

randomly varying the coefficients of the fitted response models to propagate variances through the plurality of subsystems; and finding values of signal factors and control factors that optimize the output of the manufacturing system to meet a specified criterion.

2. The computer-implemented method of claim 1, wherein fitting response models to each subsystem further includes obtaining input data on each subsystem from sources consisting of physical experiments, computer simulations, and expert opinions.

3. A computer-implemented method for determining the variability of a manufacturing system having a plurality of subsystems, comprising:

characterizing each subsystem of the plurality of subsystems by signal factors, noise factors, control factors, and an output response, all having mean and variance values;

fitting response models to each subsystem to determine unknown coefficients for use in the response models that characterize a relationship between the signal factors, noise factors, control factors, and the corresponding output response having a mean and variance that is related to the signal factors, noise factors, and control factors by obtaining a conditional probability distribution $\pi(\theta/Y)$ as a joint posterior distribution of all parameters of interest in each subsystem, where Y is a data vector of the input data and $\theta$ is a vector of unknown coefficients in each one of the response models and applying a hierarchical Bayes method to obtain values for the unknown coefficients from the conditional probability distribution;

coupling the response models for each subsystem to model an output of the manufacturing system as a whole including obtaining input data on each subsystem from sources consisting of physical experiments, computer simulations, and expert opinions;

randomly varying the coefficients of the fitted response models to propagate variances through the plurality of subsystems; and finding values of signal factors and control factors that optimize the output of the manufacturing system to meet a specified criterion.

4. The computer-implemented method of claim 3 wherein the joint posterior distribution is obtained using a Markov chain Monte Carlo simulation.

5. A computer-implemented method for determining the variability of a manufacturing system having a plurality of subsystems, comprising:

characterizing each subsystem of the plurality of subsystems by signal factors, noise factors, control factors, and an output response, all having mean and variance values;

fitting response models to each subsystem to determine unknown coefficients for use in the response models that characterize a relationship between the signal factors, noise factors, control factors, and the corresponding output response having a mean and variance that is related to the signal factors, noise factors, and control factors;

coupling the response models using a random draw for an output of each subsystem to model an output of the manufacturing system as a whole where the output from the random draw is also used as the appropriate input noise factor or control factor for one or more connected subsystems;

randomly varying the coefficients of the fitted response models to propagate variances through the plurality of subsystems; and finding values of signal factors and control factors that optimize the output of the manufacturing system to meet a specified criterion.

6. The computer implemented method of claim 5 wherein output random draws of the systems provide a predictive distribution of each subsystem that propagates subsystem response variations through the manufacturing system.

7. A computer-implemented method for determining the variability of a manufacturing system having a plurality of subsystems, comprising:

characterizing each subsystem of the plurality of subsystems by signal factors, noise factors, control factors, and an output response, all having mean and variance values;

fitting response models to each subsystem to determine unknown coefficients for use in the response models that characterize a relationship between the signal factors, noise factors, control factors, and the corresponding output response having a mean and variance that is related to the signal factors, noise factors, and control factors;

coupling the response models for each subsystem to model an output of the manufacturing system as a whole;

randomly varying the coefficients of the fitted response models to propagate variances through the plurality of subsystems; and finding values of signal factors and control factors that optimise the output of the manufacturing system to meet a specified criterion, wherein optimising the output of the manufacturing includes selecting a criterion from the criteria consisting of minimising the mean-squared error about a specified target, providing a predictive distribution less than a selected quantile, or providing the predictive distribution above a selected quantile.

* * * * *